(12) United States Patent
Petersen et al.

(10) Patent No.: US 10,693,299 B2
(45) Date of Patent: Jun. 23, 2020

(54) SELF-TUNING RESONANT POWER TRANSFER SYSTEMS

(71) Applicant: TC1 LLC, St. Paul, MN (US)

(72) Inventors: Ethan Petersen, Oakland, CA (US);
John Freddy Hansen, Pleasanton, CA (US)

(73) Assignee: TC1 LLC, St. Paul, MN (US)

( * ) Notice: Subject to any disclaimer, the term of this patent is extended or adjusted under 35 U.S.C. 154(b) by 138 days.

(21) Appl. No.: 15/976,947

(22) Filed: May 11, 2018

(65) Prior Publication Data

US 2018/0269692 A1 Sep. 20, 2018

Related U.S. Application Data

(63) Continuation of application No. 15/016,840, filed on Feb. 5, 2016, now Pat. No. 9,997,928, which is a continuation of application No. 13/953,583, filed on Jul. 29, 2013, now Pat. No. 9,287,040.

(60) Provisional application No. 61/790,682, filed on Mar. 15, 2013, provisional application No. 61/676,637, filed on Jul. 27, 2012, provisional application No. 61/676,674, filed on Jul. 27, 2012.

(51) Int. Cl.
*H02J 5/00* (2016.01)
*H02J 50/12* (2016.01)
*H02J 7/02* (2016.01)
*H02J 50/30* (2016.01)

(52) U.S. Cl.
CPC .............. *H02J 5/005* (2013.01); *H02J 7/025* (2013.01); *H02J 50/12* (2016.02); *H02J 50/30* (2016.02)

(58) Field of Classification Search
CPC .. H02J 5/005; H02J 50/10; H02J 50/12; H02J 50/30; H02J 7/025; H01F 38/14; A61B 1/00029; A61N 1/3787; H04B 5/0037
USPC ........................................................ 307/104
See application file for complete search history.

(56) References Cited

U.S. PATENT DOCUMENTS

| 4,041,955 A | 8/1977 | Kelly et al. |
| 4,352,960 A | 10/1982 | Dormer et al. |
| 4,561,443 A | 12/1985 | Hogrefe et al. |

(Continued)

FOREIGN PATENT DOCUMENTS

| DE | 202012000166 U1 | 4/2013 |
| DE | 102012201073 A1 | 7/2013 |

(Continued)

*Primary Examiner* — Hal Kaplan
(74) *Attorney, Agent, or Firm* — Armstrong Teasdale LLP

(57) ABSTRACT

Systems and designs for tuning a wireless power transfer system are provided, which may include any number of features. In one embodiment, a wireless power transfer system can be configured such that resonant frequencies of the system move towards an operating frequency of the system as a coupling coefficient between the transmit and receive resonators becomes smaller. In another embodiment, a receive controller can be configured to control a current delivered to a DC load by comparing an actual current at the DC load to a current requested by the DC load and adjusting an angle or a magnitude of a voltage at the DC load to match the requested current. In another embodiment, a rectifier circuit can act as a controlled voltage source and be configured to tune resonant frequencies between the transmit resonator and the receive resonator. Methods of use are also provided.

20 Claims, 16 Drawing Sheets

(56) References Cited

U.S. PATENT DOCUMENTS

| | | |
|---|---|---|
| 4,561,444 A | 12/1985 | Livingston et al. |
| 4,630,615 A | 12/1986 | Yomtov |
| 4,679,560 A | 7/1987 | Galbraith |
| 4,726,378 A | 2/1988 | Kaplan |
| 4,736,747 A | 4/1988 | Drake |
| 4,924,171 A | 5/1990 | Baba et al. |
| 5,346,458 A | 9/1994 | Affeld |
| 5,350,413 A | 9/1994 | Miller et al. |
| 5,569,156 A | 10/1996 | Mussivand |
| 5,630,836 A | 5/1997 | Prem et al. |
| 5,690,693 A | 11/1997 | Wang et al. |
| 5,702,431 A | 12/1997 | Wang et al. |
| 5,755,748 A | 5/1998 | Borza |
| 5,771,438 A | 6/1998 | Palermo et al. |
| 5,831,248 A | 11/1998 | Hojyo et al. |
| 5,948,006 A | 9/1999 | Mann |
| 6,123,726 A | 9/2000 | Mori et al. |
| 6,149,683 A | 11/2000 | Lancisi et al. |
| 6,212,430 B1 | 4/2001 | Kung |
| 6,312,338 B1 | 11/2001 | Sato et al. |
| 6,320,354 B1 | 11/2001 | Sengupta et al. |
| 6,324,431 B1 | 11/2001 | Zarinetchi et al. |
| 6,327,504 B1 | 12/2001 | Dolgin et al. |
| 6,389,318 B1 | 5/2002 | Zarinetchi et al. |
| 6,442,434 B1 | 8/2002 | Zarinetchi et al. |
| 6,451,055 B1 | 9/2002 | Weiss |
| 6,458,164 B1 | 10/2002 | Weiss |
| 6,478,820 B1 | 11/2002 | Weiss |
| 6,553,263 B1 | 4/2003 | Meadows et al. |
| 6,579,315 B1 | 6/2003 | Weiss |
| 6,591,139 B2 | 7/2003 | Loftin et al. |
| 6,605,032 B2 | 8/2003 | Benkowski et al. |
| 6,647,298 B2 | 11/2003 | Abrahamson et al. |
| 6,650,213 B1 | 11/2003 | Sakurai et al. |
| 6,723,039 B2 | 4/2004 | French et al. |
| 6,772,011 B2 | 8/2004 | Dolgin |
| 6,801,807 B2 | 10/2004 | Abrahamson |
| 6,810,289 B1 | 10/2004 | Shaquer |
| 6,850,803 B1 | 2/2005 | Jimenez et al. |
| 6,894,456 B2 | 5/2005 | Tsukamoto et al. |
| 6,895,281 B1 | 5/2005 | Amundson et al. |
| 6,949,065 B2 | 9/2005 | Sporer et al. |
| 6,960,968 B2 | 11/2005 | Odendaal et al. |
| 6,967,621 B1 | 11/2005 | Cadotte, Jr. et al. |
| 6,985,773 B2 | 1/2006 | Von Arx et al. |
| 7,015,769 B2 | 3/2006 | Schulman et al. |
| 7,107,103 B2 | 9/2006 | Schulman et al. |
| 7,126,310 B1 | 10/2006 | Barron |
| 7,225,032 B2 | 5/2007 | Schmeling et al. |
| 7,246,040 B2 | 7/2007 | Borg et al. |
| 7,286,880 B2 | 10/2007 | Olson et al. |
| 7,428,438 B2 | 9/2008 | Parramon et al. |
| 7,471,986 B2 | 12/2008 | Hatlestad |
| 7,496,733 B2 | 2/2009 | Altman et al. |
| 7,505,816 B2 | 3/2009 | Schmeling et al. |
| 7,515,012 B2 | 4/2009 | Schulman et al. |
| 7,522,878 B2 | 4/2009 | Baarman |
| 7,532,901 B1 | 5/2009 | Lafranchise et al. |
| 7,565,187 B1 | 7/2009 | Dynok et al. |
| 7,571,007 B2 | 8/2009 | Erickson et al. |
| 7,574,173 B2 | 8/2009 | Terranova et al. |
| 7,587,241 B2 | 9/2009 | Parramon et al. |
| 7,599,743 B2 | 10/2009 | Hassler et al. |
| 7,650,187 B2 | 1/2010 | Gruber et al. |
| 7,650,192 B2 | 1/2010 | Wahlstrand |
| 7,711,433 B2 | 5/2010 | Davis et al. |
| 7,720,546 B2 | 5/2010 | Ginggen et al. |
| 7,741,734 B2 | 6/2010 | Joannopoulos et al. |
| 7,761,164 B2 | 7/2010 | Verhoef et al. |
| 7,774,069 B2 | 8/2010 | Olson et al. |
| 7,782,190 B1 | 8/2010 | Martin et al. |
| 7,805,200 B2 | 9/2010 | Kast et al. |
| 7,812,481 B2 | 10/2010 | Iisaka et al. |
| 7,818,036 B2 | 10/2010 | Lair et al. |
| 7,818,037 B2 | 10/2010 | Lair et al. |
| 7,825,543 B2 | 11/2010 | Karalis et al. |
| 7,830,114 B2 | 11/2010 | Reed |
| 7,865,245 B2 | 1/2011 | Torgerson et al. |
| 7,872,367 B2 | 1/2011 | Recksiek et al. |
| 7,904,170 B2 | 3/2011 | Harding |
| 7,932,696 B2 | 4/2011 | Peterson et al. |
| 7,962,222 B2 | 6/2011 | He et al. |
| RE42,682 E | 9/2011 | Barreras, Sr. et al. |
| 8,076,801 B2 | 12/2011 | Karalis et al. |
| 8,081,925 B2 | 12/2011 | Parramon et al. |
| 8,096,954 B2 | 1/2012 | Stahmann et al. |
| 8,140,168 B2 | 3/2012 | Olson et al. |
| 8,150,529 B2 | 4/2012 | Snell et al. |
| 8,165,694 B2 | 4/2012 | Carbunaru et al. |
| 8,185,212 B2 | 5/2012 | Carbunaru et al. |
| 8,193,766 B2 | 6/2012 | Rondoni et al. |
| 8,203,434 B2 | 6/2012 | Yoshida |
| 8,244,367 B2 | 8/2012 | Wahlstrand et al. |
| 8,247,926 B2 | 8/2012 | Issa et al. |
| 8,258,653 B2 | 9/2012 | Kitamura et al. |
| 8,265,770 B2 | 9/2012 | Toy et al. |
| 8,278,784 B2 | 10/2012 | Cook et al. |
| 8,292,052 B2 | 10/2012 | Bohori et al. |
| 8,299,652 B2 | 10/2012 | Smith et al. |
| 8,301,079 B2 | 10/2012 | Baarman |
| 8,319,473 B2 | 11/2012 | Choi et al. |
| 8,362,742 B2 | 1/2013 | Kallmyer |
| 8,373,310 B2 | 2/2013 | Baarman et al. |
| 8,378,522 B2 | 2/2013 | Cook et al. |
| 8,378,523 B2 | 2/2013 | Cook et al. |
| 8,463,395 B2 | 6/2013 | Forsell |
| 8,489,200 B2 | 7/2013 | Zarinetchi et al. |
| 8,551,163 B2 | 10/2013 | Aber et al. |
| 8,562,508 B2 | 10/2013 | Dague et al. |
| 8,581,793 B2 | 11/2013 | Carr |
| 8,587,154 B2 | 11/2013 | Fells et al. |
| 8,620,447 B2 | 12/2013 | D'Ambrosio et al. |
| 8,628,460 B2 | 1/2014 | Yomtov et al. |
| 8,629,578 B2 | 1/2014 | Kurs et al. |
| 8,668,473 B2 | 3/2014 | Larose et al. |
| 8,694,117 B2 | 4/2014 | Aghassian et al. |
| 8,884,468 B2 | 11/2014 | Lemmens et al. |
| 8,909,351 B2 | 12/2014 | Dinsmoor et al. |
| 8,971,958 B2 | 3/2015 | Frikart et al. |
| 9,002,468 B2 | 4/2015 | Shea et al. |
| 9,106,083 B2 | 8/2015 | Partovi |
| 9,192,704 B2 | 11/2015 | Yomtov et al. |
| 9,515,494 B2 | 12/2016 | Kurs et al. |
| 9,515,495 B2 | 12/2016 | Kurs et al. |
| 9,560,787 B2 | 1/2017 | Kallmyer et al. |
| 2002/0038138 A1 | 3/2002 | Zarinetchi et al. |
| 2002/0087204 A1 | 7/2002 | Kung et al. |
| 2002/0093456 A1 | 7/2002 | Sawamura et al. |
| 2004/0138725 A1 | 7/2004 | Forsell |
| 2004/0256146 A1 | 12/2004 | Frericks et al. |
| 2005/0006083 A1 | 1/2005 | Chen et al. |
| 2005/0090883 A1 | 4/2005 | Westlund et al. |
| 2005/0288743 A1 | 12/2005 | Ahn et al. |
| 2006/0271129 A1 | 11/2006 | Tai et al. |
| 2007/0096686 A1 | 5/2007 | Jimenez et al. |
| 2007/0123948 A1 | 5/2007 | Dal Molin |
| 2007/0142696 A1 | 6/2007 | Crosby et al. |
| 2007/0191706 A1 | 8/2007 | Calderon et al. |
| 2008/0009198 A1 | 1/2008 | Marino |
| 2008/0027293 A1 | 1/2008 | Vodermayer et al. |
| 2008/0100294 A1 | 5/2008 | Rohling et al. |
| 2008/0149736 A1 | 6/2008 | Kim et al. |
| 2008/0167531 A1 | 7/2008 | McDermott |
| 2008/0211320 A1 | 9/2008 | Cook et al. |
| 2009/0018616 A1 | 1/2009 | Quick et al. |
| 2009/0051224 A1 | 2/2009 | Cook et al. |
| 2009/0072628 A1 | 3/2009 | Cook et al. |
| 2009/0081943 A1 | 3/2009 | Dobyns et al. |
| 2009/0174264 A1 | 7/2009 | Onishi et al. |
| 2009/0212736 A1 | 8/2009 | Baarman et al. |
| 2009/0226328 A1 | 9/2009 | Morello |
| 2009/0270679 A1 | 10/2009 | Hoeg et al. |
| 2009/0284220 A1 | 11/2009 | Toncich et al. |
| 2010/0019985 A1 | 1/2010 | Bashyam et al. |

(56) References Cited

U.S. PATENT DOCUMENTS

| | | |
|---|---|---|
| 2010/0033021 A1 | 2/2010 | Bennett |
| 2010/0035453 A1 | 2/2010 | Tronnes et al. |
| 2010/0045114 A1 | 2/2010 | Sample et al. |
| 2010/0063347 A1 | 3/2010 | Yomtov et al. |
| 2010/0066305 A1 | 3/2010 | Takahashi et al. |
| 2010/0069992 A1 | 3/2010 | Aghassian et al. |
| 2010/0109958 A1 | 5/2010 | Haubrich et al. |
| 2010/0114143 A1 | 5/2010 | Albrecht et al. |
| 2010/0122995 A1 | 5/2010 | Thomas et al. |
| 2010/0171368 A1 | 7/2010 | Schatz et al. |
| 2010/0184371 A1 | 7/2010 | Cook et al. |
| 2010/0194334 A1 | 8/2010 | Kirby et al. |
| 2010/0210233 A1 | 8/2010 | Cook et al. |
| 2010/0211134 A1 | 8/2010 | Forsell |
| 2010/0222848 A1 | 9/2010 | Forsell |
| 2010/0222849 A1 | 9/2010 | Forsell |
| 2010/0225174 A1 | 9/2010 | Jiang |
| 2010/0244576 A1 | 9/2010 | Hillan et al. |
| 2010/0256708 A1 | 10/2010 | Thornton et al. |
| 2010/0277121 A1 | 11/2010 | Hall et al. |
| 2010/0308939 A1 | 12/2010 | Kurs |
| 2010/0314946 A1 | 12/2010 | Budde et al. |
| 2010/0331919 A1 | 12/2010 | Digiore et al. |
| 2011/0025132 A1 | 2/2011 | Sato |
| 2011/0043050 A1 | 2/2011 | Yabe et al. |
| 2011/0046699 A1 | 2/2011 | Mazanec et al. |
| 2011/0101790 A1 | 5/2011 | Budgett |
| 2011/0115431 A1 | 5/2011 | Dunworth et al. |
| 2011/0127848 A1 | 6/2011 | Ryu et al. |
| 2011/0148215 A1 | 6/2011 | Marzetta et al. |
| 2011/0178361 A1 | 7/2011 | Yomtov |
| 2011/0234155 A1 | 9/2011 | Chen et al. |
| 2011/0241436 A1 | 10/2011 | Furukawa |
| 2011/0245892 A1 | 10/2011 | Kast et al. |
| 2011/0266880 A1* | 11/2011 | Kim .................. H02J 50/12 307/104 |
| 2011/0278948 A1 | 11/2011 | Forsell |
| 2011/0291489 A1 | 12/2011 | Tsai et al. |
| 2011/0291613 A1 | 12/2011 | Rosik et al. |
| 2011/0295345 A1 | 12/2011 | Wells et al. |
| 2011/0298294 A1 | 12/2011 | Takada et al. |
| 2011/0301667 A1 | 12/2011 | Olson et al. |
| 2011/0313238 A1 | 12/2011 | Reichenbach et al. |
| 2012/0001485 A1 | 1/2012 | Uchida |
| 2012/0032522 A1 | 2/2012 | Schatz et al. |
| 2012/0039102 A1 | 2/2012 | Shinoda |
| 2012/0057322 A1 | 3/2012 | Waffenschmidt |
| 2012/0065458 A1 | 3/2012 | Tol |
| 2012/0080957 A1 | 4/2012 | Cooper et al. |
| 2012/0091951 A1 | 4/2012 | Sohn |
| 2012/0104997 A1 | 5/2012 | Carobolante |
| 2012/0109256 A1 | 5/2012 | Meskins et al. |
| 2012/0119914 A1 | 5/2012 | Uchida |
| 2012/0146575 A1 | 6/2012 | Armstrong et al. |
| 2012/0149229 A1 | 6/2012 | Kearsley |
| 2012/0150259 A1 | 6/2012 | Meskens |
| 2012/0153954 A1 | 6/2012 | Ota et al. |
| 2012/0157753 A1 | 6/2012 | D'Ambrosio |
| 2012/0157754 A1 | 6/2012 | D'Ambrosio |
| 2012/0161539 A1 | 6/2012 | Kim et al. |
| 2012/0164943 A1 | 6/2012 | Bennett |
| 2012/0169132 A1 | 7/2012 | Choudhary et al. |
| 2012/0169133 A1 | 7/2012 | Lisi et al. |
| 2012/0169137 A1 | 7/2012 | Lisi et al. |
| 2012/0169139 A1 | 7/2012 | Kudo |
| 2012/0169278 A1 | 7/2012 | Choi et al. |
| 2012/0175967 A1 | 7/2012 | Dibben et al. |
| 2012/0239118 A1 | 9/2012 | Ozawa et al. |
| 2012/0245649 A1 | 9/2012 | Bohori et al. |
| 2012/0245664 A1 | 9/2012 | Smith et al. |
| 2012/0259398 A1 | 10/2012 | Chen et al. |
| 2012/0274148 A1 | 11/2012 | Sung et al. |
| 2012/0306433 A1* | 12/2012 | Kim .................. H02J 50/12 320/106 |
| 2013/0007949 A1 | 1/2013 | Kurs et al. |
| 2013/0060103 A1 | 3/2013 | Bergida et al. |
| 2013/0119773 A1 | 5/2013 | Davis |
| 2013/0127253 A1 | 5/2013 | Stark et al. |
| 2013/0159956 A1 | 6/2013 | Verghese et al. |
| 2013/0190551 A1 | 7/2013 | Callaway et al. |
| 2013/0214731 A1 | 8/2013 | Dinsmoor et al. |
| 2013/0241468 A1 | 9/2013 | Moshfeghi |
| 2013/0271088 A1 | 10/2013 | Hwang et al. |
| 2013/0289334 A1 | 10/2013 | Badstibner et al. |
| 2013/0310630 A1 | 11/2013 | Smith et al. |
| 2013/0320773 A1 | 12/2013 | Schatz et al. |
| 2013/0331638 A1 | 12/2013 | Cameron et al. |
| 2014/0005466 A1 | 1/2014 | Crosby et al. |
| 2014/0011447 A1 | 1/2014 | Konanur et al. |
| 2014/0028110 A1 | 1/2014 | Petersen et al. |
| 2014/0028111 A1 | 1/2014 | Hansen et al. |
| 2014/0031606 A1 | 1/2014 | Hansen et al. |
| 2014/0265620 A1 | 9/2014 | Hoarau et al. |
| 2014/0265621 A1 | 9/2014 | Wong et al. |
| 2014/0275727 A1 | 9/2014 | Bonde et al. |
| 2015/0207330 A1 | 7/2015 | Petersen |
| 2015/0207331 A1 | 7/2015 | Petersen |
| 2015/0222127 A1 | 8/2015 | Hansen et al. |
| 2015/0222128 A1 | 8/2015 | Hansen |
| 2015/0222139 A1 | 8/2015 | Petersen et al. |
| 2015/0290373 A1 | 10/2015 | Rudser et al. |
| 2016/0218432 A1 | 7/2016 | Pope et al. |
| 2016/0250484 A1 | 9/2016 | Nguyen et al. |
| 2016/0254703 A1 | 9/2016 | Hansen |
| 2016/0254704 A1 | 9/2016 | Hansen et al. |

FOREIGN PATENT DOCUMENTS

| | | |
|---|---|---|
| EP | 1513241 A1 | 3/2005 |
| JP | H03109063 A | 5/1991 |
| JP | H11506646 A | 6/1999 |
| WO | 0074747 A1 | 12/2000 |
| WO | 0137926 A1 | 5/2001 |
| WO | 2005106901 A2 | 11/2005 |
| WO | 2007053881 A1 | 5/2007 |
| WO | 2008066941 A2 | 6/2008 |
| WO | 2009018271 A1 | 2/2009 |
| WO | 2009021220 A1 | 2/2009 |
| WO | 2009023905 A1 | 2/2009 |
| WO | 2009042977 A1 | 4/2009 |
| WO | 2010030378 A1 | 3/2010 |
| WO | 2010089354 A2 | 8/2010 |
| WO | 2011113934 A1 | 9/2011 |
| WO | 2012002063 A1 | 1/2012 |
| WO | 2012056365 A2 | 5/2012 |
| WO | 2012087807 A2 | 6/2012 |
| WO | 2012087811 A2 | 6/2012 |
| WO | 2012087816 A2 | 6/2012 |
| WO | 2012087819 A2 | 6/2012 |
| WO | 2012141752 A2 | 10/2012 |
| WO | 2013138451 A1 | 9/2013 |
| WO | 2014039673 A1 | 3/2014 |

* cited by examiner $$k \approx \frac{A_2}{A_1}$$

SELF-TUNING RESONANT POWER TRANSFER SYSTEMS

CROSS-REFERENCE TO RELATED APPLICATIONS

This application is a continuation of U.S. Non-Provisional patent application Ser. No. 15/016,840, filed on Feb. 5, 2016, titled "Self-Tuning Resonant Power Transfer Systems", which is a continuation of U.S. Non-Provisional patent application Ser. No. 13/953,583, filed on Jul. 29, 2013, titled "Self-Tuning Resonant Power Transfer Systems" which claims the benefit of U.S. Provisional Patent Application No. 61/676,637, filed on Jul. 27, 2012, titled "Self-Tuning Resonant Power Transfer Systems", U.S. Provisional Patent Application No. 61/790,682, filed on Mar. 15, 2013, titled "Self-Tuning Resonant Power Transfer Systems", and U.S. Provisional Patent Application No. 61/676,674, filed on Jul. 27, 2012, titled "Resonant Power Transfer Systems Having Synchronous Rectification".

INCORPORATION BY REFERENCE

All publications and patent applications mentioned in this specification are herein incorporated by reference to the same extent as if each individual publication or patent application was specifically and individually indicated to be incorporated by reference.

FIELD

The field relates generally to resonant wireless power transfer systems, and more specifically to implantable resonant wireless power transfer systems.

BACKGROUND

Many implantable medical devices require electrical systems to power the implant. Typically, this is achieved using percutaneous wiring to connect a power source to the implant.

More recently, there has been development into powering an implanted device wirelessly with a Transcutaneous Energy Transfer (TET) system, e.g., through an oscillating magnetic field. For a TET system to be useful, electrical energy storage and processing must be provided when external power is interrupted or not available. This electrical energy processing and storage can be implemented with solid-state electronics and a battery.

Typically, implantable medical devices, such as implanted sensors, require very little power to operate. With such low power levels (on the order of milliwatts), power transfer levels and efficiency can be lower. With higher power devices (e.g. on the order of watts and up to 15 W or more), efficient transfer of wireless power is extremely important. Additionally, positions within the body are limited that can accommodate larger implanted devices, some of which are deep below the skin surface. These implant locations require additional attention to position and orientation of both the transmit and receive coils, as well as techniques to improve and maximize transfer efficiency.

Previous TET systems for implantable medical devices required the implanted receiver coil to be positioned just under the skin, and typically include a mechanical feature to align the receive and transmit coils and keep them together. By implanting these devices directly under the skin, the size and power requirements of these implanted devices is limited if they are to be powered by a TET system.

SUMMARY OF THE DISCLOSURE

A wireless power transfer system is provided, comprising a transmit resonator coupled to a voltage source and a first impedance matching network, and a receive resonator coupled to a second impedance matching network, the receive resonator being inductively coupled to the transmit resonator, the system being configured such that resonant frequencies of the system move towards an operating frequency of the system as a coupling coefficient between the transmit and receive resonators becomes smaller.

In some embodiments, resonator tuning between the receiver and transmit resonators is optimized to keep a voltage gain within a specified range as the coupling coefficient varies.

In other embodiments, resonator tuning between the receiver and transmit resonators is optimized to maximize efficiency over a given range.

In one embodiment, resonator tuning between the receiver and transmit resonators is optimized to achieve a minimum amount of power transferred for a given source voltage.

In some embodiments, the system is self-tuning and does not require an external control system to operate.

A method of controlling a wireless power transfer system is also provided, comprising the steps of transmitting wireless power from a transmit resonator to a receive resonator, and allowing resonant frequencies of the system to move towards an operating frequency of the system as a coupling coefficient between the transmit and receive resonators becomes smaller.

A wireless power transfer system is provided, comprising a transmit resonator coupled to a voltage source and a first magnetic impedance matching network, a receive resonator coupled to a second magnetic impedance matching network, the receive resonator being inductively coupled to the transmit resonator, a transmit controller coupled to the first magnetic impedance matching network, the transmit controller configured to control a current in the first magnetic impedance matching network to generate a magnetic field in the transmit resonator, and a receive controller coupled to the second magnetic impedance matching network, the receive controller configured to control a current delivered to a DC load by comparing an actual current at the DC load to a current requested by the DC load and adjusting an angle or a magnitude of a voltage at the DC load to match the requested current.

In some embodiments, the DC load comprises a battery of an implantable medical device attached to the receive resonator.

In another embodiment, the current requested by the DC load is determined by a battery charge algorithm executed on the receive controller.

A method of controlling a wireless power transfer system is provided, comprising the steps of transmitting wireless power from a transmit resonator to a receive resonator, and controlling a current delivered to a DC load connected to the receive resonator by comparing an actual current at the DC load to a current requested by the DC load and adjusting an angle or a magnitude of a voltage at the DC load to match the requested current.

A wireless power transfer system is provided, comprising a transmit resonator coupled to a voltage source, and a receive resonator inductively coupled to the transmit resonator and connected to a load with a rectifier circuit comprising a plurality of FETs, wherein the rectifier circuit acts as a controlled voltage source and is configured to tune resonant frequencies between the transmit resonator and the receive resonator.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
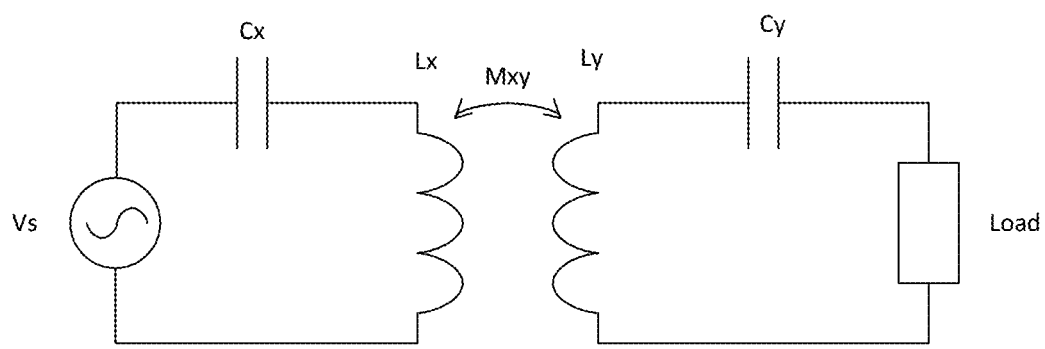
FIG. 1 illustrates a basic wireless power transfer system.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Various aspects of the invention are similar to those described in International Patent Pub. No. WO2012045050; U.S. Pat. Nos. 8,140,168; 7,865,245; 7,774,069; 7,711,433; 7,650,187; 7,571,007; 7,741,734; 7,825,543; 6,591,139; 6,553,263; and 5,350,413; and U.S. Pub. Nos. 2010/0308939; 2008/027293; and 2010/0102639, the entire contents of which patents and applications are incorporated herein for all purposes.

Wireless Power Transmission System

Power may be transmitted wirelessly by magnetic induction. In various embodiments, the transmitter and receiver are closely coupled.

In some cases "closely coupled" or "close coupling" refers to a system that requires the coils to be very near each other in order to operate. In some cases "loosely coupled" or "loose coupling" refers to a system configured to operate when the coils have a significant spatial and/or axial separation, and in some cases up to distance equal to or less than the diameter of the larger of the coils. In some cases, "loosely coupled" or "loose coupling" refers a system that is relatively insensitive to changes in physical separation and/ or orientation of the receiver and transmitter.

In various embodiments, the transmitter and receiver are non-resonant coils. For example, a change in current in one coil induces a changing magnetic field. The second coil within the magnetic field picks up the magnetic flux, which in turn induces a current in the second coil. An example of a closely coupled system with non-resonant coils is described in International Pub. No. WO2000/074747, incorporated herein for all purposes by reference. A conventional transformer is another example of a closely coupled, non-resonant system. In various embodiments, the transmitter and receiver are resonant coils. For example, one or both of the coils is connected to a tuning capacitor or other means for controlling the frequency in the respective coil. An example of closely coupled system with resonant coils is described in International Pub. Nos. WO2001/037926; WO2012/087807; WO2012/087811; WO2012/087816; WO2012/087819; WO2010/030378; and WO2012/056365, and U.S. Pub. No. 2003/0171792, incorporated herein for all purposes by reference.

In various embodiments, the transmitter and receiver are loosely coupled. For example, the transmitter can resonate to propagate magnetic flux that is picked up by the receiver at relatively great distances. In some cases energy can be transmitted over several meters. In a loosely coupled system power transfer may not necessarily depend on a critical distance. Rather, the system may be able to accommodate changes to the coupling coefficient between the transmitter and receiver. An example of a loosely coupled system is described in International Pub. No. WO2012/045050, incorporated herein for all purposes by reference.

Power may be transmitted wirelessly by radiating energy. In various embodiments, the system comprises antennas. The antennas may be resonant or non-resonant. For example, non-resonant antennas may radiate electromagnetic waves to create a field. The field can be near field or far field. The field can be directional. Generally far field has greater range but a lower power transfer rate. An example of such a system for radiating energy with resonators is described in International Pub. No. WO2010/089354, incorporated herein for all purposes by reference. An example of such a non-resonant system is described in International Pub. No. WO2009/018271, incorporated herein for all purposes by reference. Instead of antenna, the system may comprise a high energy light source such as a laser. The system can be configured so photons carry electromagnetic energy in a spatially restricted, direct, coherent path from a transmission point to a receiving point. An example of such a system is described in International Pub. No. WO2010/089354, incorporated herein for all purposes by reference.

Power may also be transmitted by taking advantage of the material or medium through which the energy passes. For example, volume conduction involves transmitting electrical energy through tissue between a transmitting point and a receiving point. An example of such a system is described in International Pub. No. WO2008/066941, incorporated herein for all purposes by reference.

Power may also be transferred using a capacitor charging technique. The system can be resonant or non-resonant. Exemplars of capacitor charging for wireless energy transfer are described in International Pub. No. WO2012/056365, incorporated herein for all purposes by reference.

The system in accordance with various aspects of the invention will now be described in connection with a system for wireless energy transfer by magnetic induction. The exemplary system utilizes resonant power transfer. The system works by transmitting power between the two inductively coupled coils. In contrast to a transformer, however, the exemplary coils are not coupled together closely. A transformer generally requires the coils to be aligned and positioned directly adjacent each other. The exemplary system accommodates looser coupling of the coils.

While described in terms of one receiver coil and one transmitter coil, one will appreciate from the description herein that the system may use two or more receiver coils and two or more transmitter coils. For example, the transmitter may be configured with two coils—a first coil to resonate flux and a second coil to excite the first coil. One will further appreciate from the description herein that usage of "resonator" and "coil" may be used somewhat interchangeably. In various respects, "resonator" refers to a coil and a capacitor connected together.

In accordance with various embodiments of this disclosure, the system comprises one or more transmitters configured to transmit power wirelessly to one or more receivers. In various embodiments, the system includes a transmitter and more than one receiver in a multiplexed arrangement. A frequency generator may be electrically coupled to the transmitter to drive the transmitter to transmit power at a particular frequency or range of frequencies. The frequency generator can include a voltage controlled oscillator and one or more switchable arrays of capacitors, a voltage controlled oscillator and one or more varactors, a phase-locked-loop, a direct digital synthesizer, or combinations thereof. The transmitter can be configured to transmit power at multiple frequencies simultaneously. The frequency generator can include two or more phase-locked-loops electrically coupled to a common reference oscillator, two or more independent voltage controlled oscillators, or combinations thereof. The transmitter can be arranged to simultaneously delivery power to multiple receivers at a common frequency.

In various embodiments, the transmitter is configured to transmit a low power signal at a particular frequency. The transmitter may transmit the low power signal for a particular time and/or interval. In various embodiments, the transmitter is configured to transmit a high power signal wirelessly at a particular frequency. The transmitter may transmit the high power signal for a particular time and/or interval.

In various embodiments, the receiver includes a frequency selection mechanism electrically coupled to the receiver coil and arranged to allow the resonator to change a frequency or a range of frequencies that the receiver can receive. The frequency selection mechanism can include a switchable array of discrete capacitors, a variable capacitance, one or more inductors electrically coupled to the receiving antenna, additional turns of a coil of the receiving antenna, or combinations thereof.

In general, most of the flux from the transmitter coil does not reach the receiver coil. The amount of flux generated by the transmitter coil that reaches the receiver coil is described by "k" and referred to as the "coupling coefficient."

In various embodiments, the system is configured to maintain a value of k in the range of between about 0.2 to about 0.01. In various embodiments, the system is configured to maintain a value of k of at least 0.01, at least 0.02, at least 0.03, at least 0.04, or at least 0.05.

In various embodiments, the coils are physically separated. In various embodiments, the separation is greater than a thickness of the receiver coil. In various embodiments, the separation distance is equal to or less than the diameter of the larger of the receiver and transmitter coil.

Because most of the flux does not reach the receiver, the transmitter coil must generate a much larger field than what is coupled to the receiver. In various embodiments, this is accomplished by configuring the transmitter with a large number of amp-turns in the coil.

Since only the flux coupled to the receiver gets coupled to a real load, most of the energy in the field is reactive. The current in the coil can be sustained with a capacitor connected to the coil to create a resonator. The power source thus only needs to supply the energy absorbed by the receiver. The resonant capacitor maintains the excess flux that is not coupled to the receiver.

In various embodiments, the impedance of the receiver is matched to the transmitter. This allows efficient transfer of energy out of the receiver. In this case the receiver coil may not need to have a resonant capacitor.

Turning now to FIG. 1, a simplified circuit for wireless energy transmission is shown. The exemplary system shows a series connection, but the system can be connected as either series or parallel on either the transmitter or receiver side.

The exemplary transmitter includes a coil Lx connected to a power source Vs by a capacitor Cx. The exemplary receiver includes a coil Ly connected to a load by a capacitor Cy. Capacitor Cx may be configured to make Lx resonate at a desired frequency. Capacitance Cx of the transmitter coil may be defined by its geometry. Inductors Lx and Ly are connected by coupling coefficient k. Mxy is the mutual inductance between the two coils. The mutual inductance, Mxy, is related to coupling coefficient, k.

$$Mxy = k\sqrt{Lx \cdot Ly}$$

In the exemplary system the power source Vs is in series with the transmitter coil Lx so it may have to carry all the reactive current. This puts a larger burden on the current rating of the power source and any resistance in the source will add to losses.

The exemplary system includes a receiver configured to receive energy wirelessly transmitted by the transmitter. The exemplary receiver is connected to a load. The receiver and load may be connected electrically with a controllable switch.

In various embodiments, the receiver includes a circuit element configured to be connected or disconnected from the receiver coil by an electronically controllable switch. The electrical coupling can include both a serial and parallel arrangement. The circuit element can include a resistor, capacitor, inductor, lengths of an antenna structure, or combinations thereof. The system can be configured such that power is transmitted by the transmitter and can be received by the receiver in predetermined time increments.

In various embodiments, the transmitter coil and/or the receiver coil is a substantially two-dimensional structure. In various embodiments, the transmitter coil may be coupled to a transmitter impedance-matching structure. Similarly, the receiver coil may be coupled to a receiver impedance-matching structure. Examples of suitable impedance-matching structures include, but are not limited to, a coil, a loop, a transformer, and/or any impedance-matching network. An impedance-matching network may include inductors or capacitors configured to connect a signal source to the resonator structure.

In various embodiments, the transmitter is controlled by a controller (not shown) and driving circuit. The controller and/or driving circuit may include a directional coupler, a signal generator, and/or an amplifier. The controller may be configured to adjust the transmitter frequency or amplifier gain to compensate for changes to the coupling between the receiver and transmitter.

In various embodiments, the transmitter coil is connected to an impedance-matched coil loop. The loop is connected to a power source and is configured to excite the transmitter coil. The first coil loop may have finite output impedance. A signal generator output may be amplified and fed to the transmitter coil. In use power is transferred magnetically between the first coil loop and the main transmitter coil, which in turns transmits flux to the receiver. Energy received by the receiver coil is delivered by Ohmic connection to the load.

One of the challenges to a practical circuit is how to get energy in and out of the resonators. Simply putting the power source and load in series or parallel with the resonators is difficult because of the voltage and current required. In various embodiments, the system is configured to achieve an approximate energy balance by analyzing the system characteristics, estimating voltages and currents involved, and controlling circuit elements to deliver the power needed by the receiver.

In an exemplary embodiment, the system load power, $P_L$, is assumed to be 15 Watts and the operating frequency of the system, f, is 250 kHz. Then, for each cycle the load removes a certain amount of energy from the resonance:

$$e_L = \frac{P_L}{f} = 60 \text{ μJ} \text{ Energy the load removes from one cycle}$$

$$e_L = \frac{P_L}{f} = 60 \text{ μJ} \text{ Energy the load removes in one cycle}$$

It has been found that the energy in the receiver resonance is typically several times larger than the energy removed by the load for operative, implantable medical devices. In various embodiments, the system assumes a ratio 7:1 for energy at the receiver versus the load removed. Under this assumption, the instantaneous energy in the exemplary receiver resonance is 420 μJ.

The exemplary circuit was analyzed and the self inductance of the receiver coil was found to be 60 uH. From the energy and the inductance, the voltage and current in the resonator could be calculated.

$$e_y = \frac{1}{2} L i^2$$

-continued $$i_y = \sqrt{\frac{2e_y}{L}} = 3.74 \text{ A peak}$$

$$v_y = \omega L_y i_y = 352 \text{ V peak}$$

The voltage and current can be traded off against each other. The inductor may couple the same amount of flux regardless of the number of turns. The Amp-turns of the coil needs to stay the same in this example, so more turns means the current is reduced. The coil voltage, however, will need to increase. Likewise, the voltage can be reduced at the expense of a higher current. The transmitter coil needs to have much more flux. The transmitter flux is related to the receiver flux by the coupling coefficient. Accordingly, the energy in the field from the transmitter coil is scaled by k.

$$e_x = \frac{e_y}{k}$$

Given that k is 0.05:

$$e_x = \frac{420 \text{ μJ}}{0.05} = 8.4 \text{ mJ}$$

For the same circuit the self inductance of the transmitter coil was 146 uH as mentioned above. This results in:

$$i_x = \sqrt{\frac{2e_x}{L}} = 10.7 \text{ A peak}$$

$$v_x = \omega L_x i_x = 2460 \text{ V peak}$$

One can appreciate from this example, the competing factors and how to balance voltage, current, and inductance to suit the circumstance and achieve the desired outcome. Like the receiver, the voltage and current can be traded off against each other. In this example, the voltages and currents in the system are relatively high. One can adjust the tuning to lower the voltage and/or current at the receiver if the load is lower.

Estimation of Coupling Coefficient and Mutual Inductance

As explained above, the coupling coefficient, k, may be useful for a number of reasons. In one example, the coupling coefficient can be used to understand the arrangement of the coils relative to each other so tuning adjustments can be made to ensure adequate performance. If the receiver coil moves away from the transmitter coil, the mutual inductance will decrease, and ceteris paribus, less power will be transferred. In various embodiments, the system is configured to make tuning adjustments to compensate for the drop in coupling efficiency.

The exemplary system described above often has imperfect information. For various reasons as would be understood by one of skill in the art, the system does not collect data for all parameters. Moreover, because of the physical gap between coils and without an external means of communications between the two resonators, the transmitter may have information that the receiver does not have and vice versa. These limitations make it difficult to directly measure and derive the coupling coefficient, k, in real time.

Described below are several principles for estimating the coupling coefficient, k, for two coils of a given geometry. The approaches may make use of techniques such as Biot-Savart calculations or finite element methods. Certain assumptions and generalizations, based on how the coils interact in specific orientations, are made for the sake of simplicity of understanding. From an electric circuit point of view, all the physical geometry permutations can generally lead to the coupling coefficient.

Figure 2:
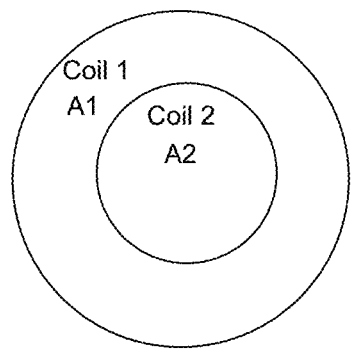
FIG. 2 illustrates the flux generated by a pair of coils.

If two coils are arranged so they are in the same plane, with one coil circumscribing the other, then the coupling coefficient can be estimated to be roughly proportional to the ratio of the area of the two coils. This assumes the flux generated by coil 1 is roughly uniform over the area it encloses as shown in FIG. 2.

Figure 3A:
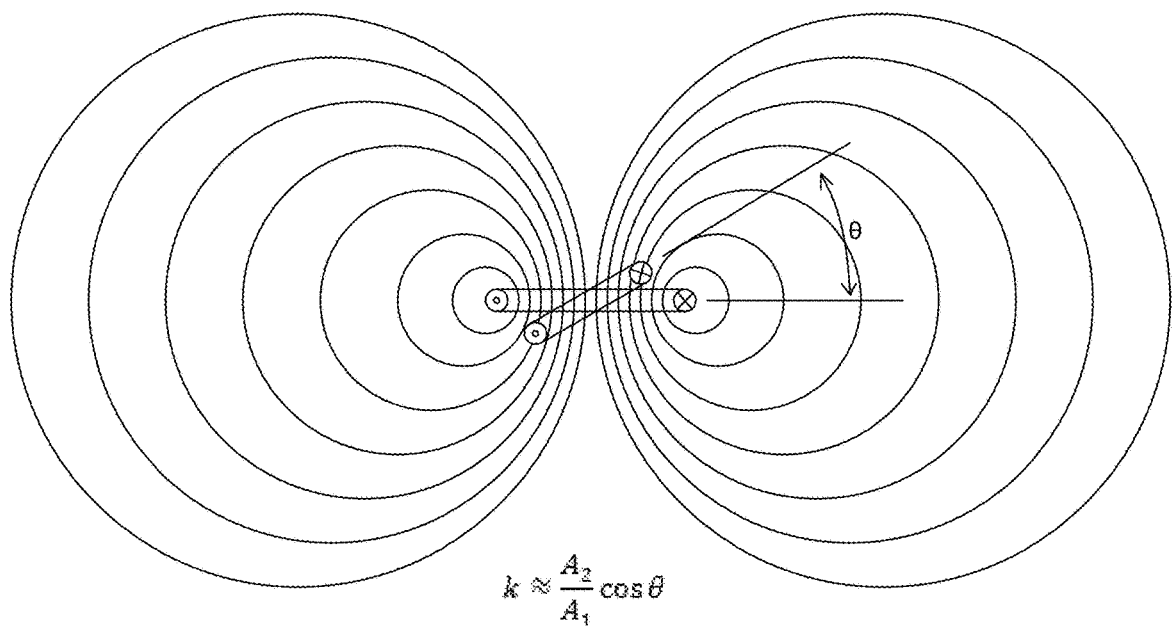
FIGS. 3A-3B illustrate the effect of coil alignment on the coupling coefficient.

If the coils are out of alignment such that the coils are at a relative angle, the coupling coefficient will decrease. The amount of the decrease is estimated to be about equal to the cosine of the angle as shown in FIG. 3A. If the coils are orthogonal to each other such that theta (θ) is 90 degrees, the flux will not be received by the receiver and the coupling coefficient will be zero.

Figure 3B:
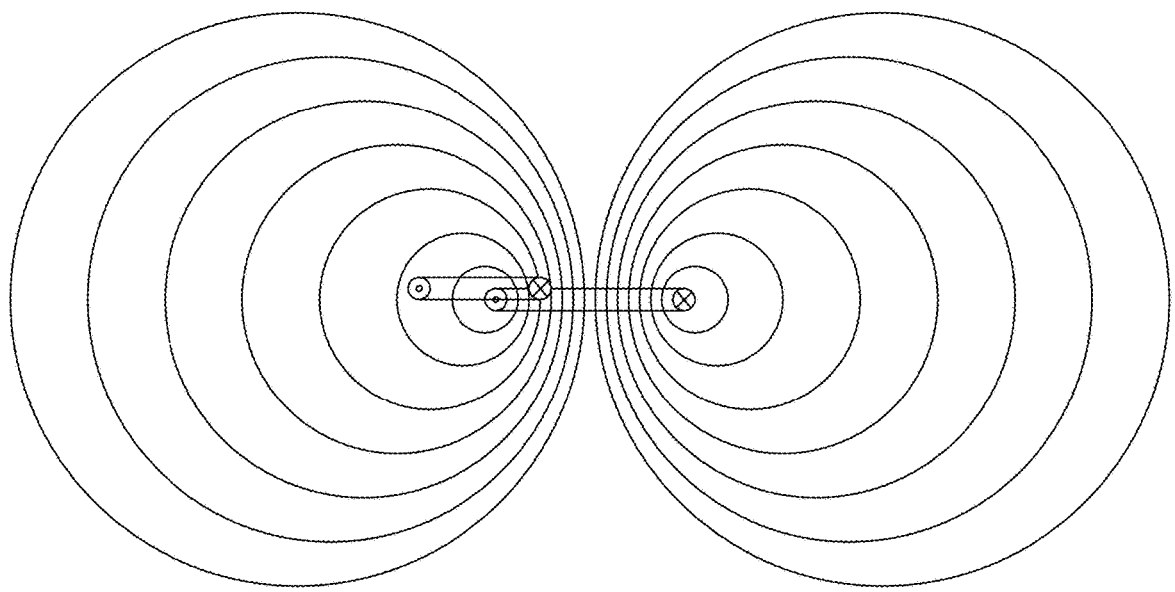

If the coils are arranged such that half the flux from one coil is in one direction and the other half is in the other direction, the flux cancels out and the coupling coefficient is zero, as shown in FIG. 3B.

A final principle relies on symmetry of the coils. The coupling coefficient and mutual inductance from one coil to the other is assumed to be the same regardless of which coil is being energized.

$$M_{xy}=M_{yx}$$

Systems and methods are provided herein for wirelessly transmitting power from an external power transmitter to a separate power receiver. The TET systems described herein can be configured to wirelessly transmit power from a transmitter positioned outside of a human body to a receiver implanted within the body. The receiver can be coupled to circuitry and a power source to power and operate an implantable medical device coupled to the receiver.

In some embodiments, the resonant systems described herein can operate at high voltages (possibly greater than 1000 Vac rms) to transmit the high power levels required by some implantable applications. For example, power levels of as high as approximately 15 W or more are typically required for a fully implanted LVAD system. In these embodiments, a voltage divider can be used in the TET system so that the load of the receiver resonator and power source of the transmitter resonator can operate at a lower voltage than other parts of the LVAD system. The voltage of the driving circuit and load can be dictated by a battery pack, which is typically in the range of 12-20 Vdc. This disclosure describes various embodiments on how this can be implemented in a TET system.

Figure 4:
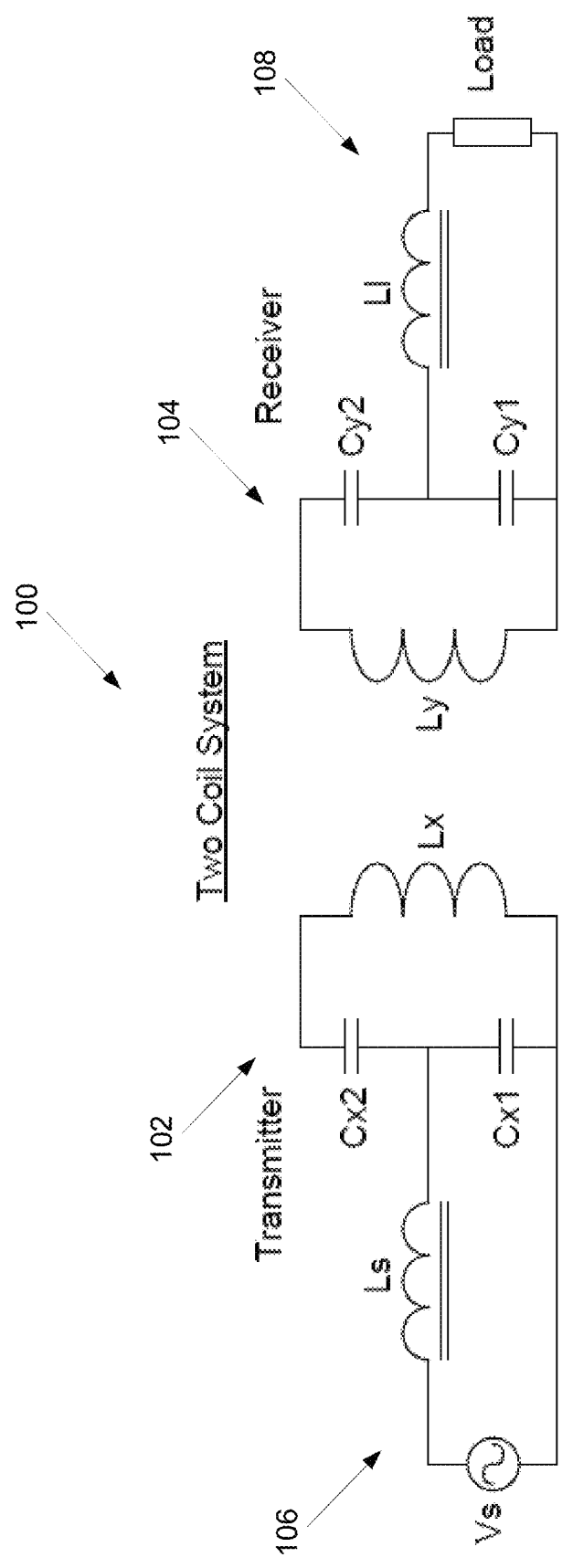
FIG. 4 illustrates a two-coil system having a transmitter and a receiver.
Figure 5:
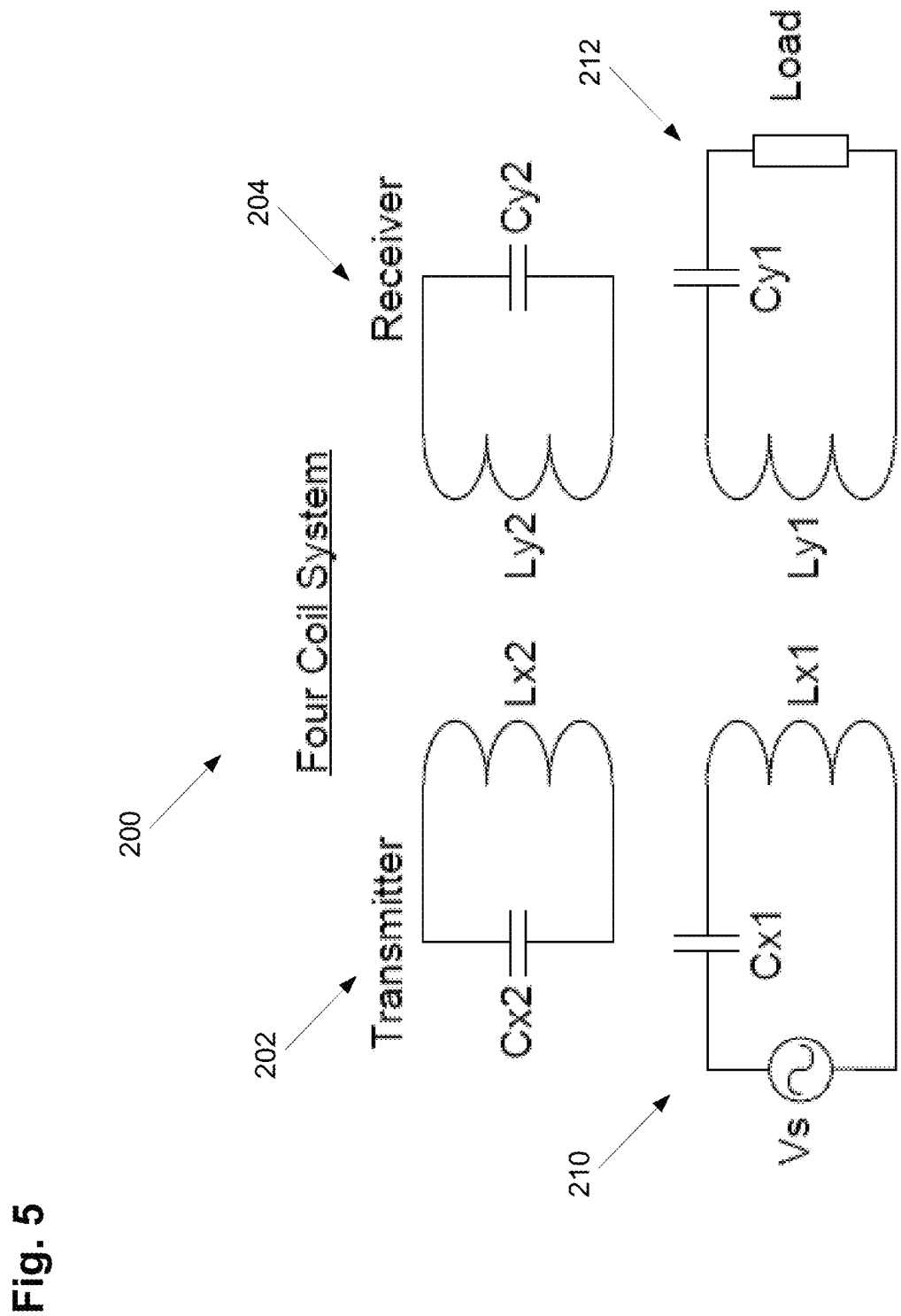
FIG. 5 shows a four-coil system having a transmitter and a receiver.

In one embodiment, a voltage divider is formed from capacitors, as shown in FIG. 4. Another embodiment divides down the voltage of system 200 with a transformer circuit, as shown in FIG. 5. There can be many variations on these circuits that all behave similarly. For instance the inductors in the capacitor divider circuit shown in FIG. 1 can be configured such that they have some mutual coupling. This would be a hybrid of the two circuits. It is also possible to mix the circuits used for the receiver and the transmitter such that the transmitter has one configuration and the receiver has another.

In a first embodiment, shown in FIG. 4, a TET system 100 comprises two resonant systems, a transmitter resonator 102 and a receiver resonator 104. Each of the resonant systems can be connected to a voltage divider circuit. Transmitter resonator 102 includes an inductor Lx and a capacitor Cx2 configured as a tank circuit. Receiver resonator 104 includes an inductor Ly and a capacitor Cy2 configured as a tank circuit. In order to excite each resonant system an impedance matching circuit can connect the transmitter resonator to the power source and the receiver resonator to the load. This way the load and power source only have to supply the real part of the power, and the reactive part of the power is handled by the impedance matching circuit.

In FIG. 4, the impedance matching circuits can comprise voltage dividers formed from capacitors. Voltage divider 106 can be coupled to transmitter resonator 102 and can comprise capacitor Cx1 and inductor Ls, coupled to voltage source Vs. Voltage divider 108 can be coupled to receiver resonator 104 and can comprise capacitor Cy1 and inductor L1, coupled to the Load. An additional inductor may be needed in series with the source and load. In a practical circuit the source is most likely a FET push pull circuit operating as a square wave voltage source. The output of the voltage source should not be placed directly across a capacitor or there will be extremely large currents on the switching transitions.

Many drive circuits are possible in addition to the FET push pull circuit (class-D amplifier). These include variations on resonant power amplifiers (classes B, C, and E) or self resonant circuits such as a Royer oscillator. Linear amplifiers (classes A and A-B) will also work, but will have lower efficiency.

In a second embodiment of TET system 200, shown in FIG. 5, transmitter resonator 202 includes an inductor Lx2 and a capacitor Cx2 configured as a tank circuit. Receiver resonator 204 includes an inductor Ly2 and a capacitor Cy2 configured as a tank circuit. The impedance matching circuits can comprise transformer circuits. Transformer circuit 210 can be inductively coupled to transmitter resonator 202 and can include capacitor Cx1 and inductor Lx1 coupled to voltage source Vs. Transformer circuit 212 can be inductively coupled to receiver resonator 204 and can comprise capacitor Cy1 and inductor Ly2, coupled to the Load.

In FIG. 5, the two coils on the transmitter can act like a transformer so that the voltage on Lx1 is much smaller than the voltage on Lx2. Lx2 and Cx2 make up the transmitter resonator, and Lx1 and Cx1 act as an exciter to keep the resonance going.

Both variations described in FIGS. 4 and 5 can be designed to work equally well. There will be trade-offs relating to the details of each, but the advantages and disadvantages will be specific to a particular implementation. In some embodiments, it is possible to combine the circuits; for example, the transmitter receiver could utilize the impedance matching circuit of FIG. 4, and the receiver transmitter could utilize the impedance matching circuit of FIG. 5.

One aspect of this disclosure is to tune the resonant circuits to make the circuit relatively insensitive to the relative position and alignment of the transmitter and receiver coils. The percentage of flux coupling the transmitter and receiver resonators is referred to as the coupling coefficient or Previous TET systems have required a large value of k. The embodiments described above in FIGS. 4 and 5 are relatively insensitive to k and will work well down to small values. This is important as the transmitter and receiver are placed farther apart, and may not be well aligned.

The main parameters of a resonant system that are addressed in this invention are the power efficiency (e.g., the ratio of the input power to the output power), and the voltage gain (e.g., the input supply voltage to the output voltage). The circuit can be designed, choosing appropriate values of inductances, mutual inductances, and capacitances, to have specific resonant frequencies that vary as a function of coupling coefficient. The systems described above optimize these parameters by being designed such that the resonant frequency of the transmitter and receiver changes based on the coupling coefficient. As k gets smaller the resonant frequencies of the resonators both get closer to the operating frequency. As the resonant frequency of the resonators gets closer to the operating frequency, the voltage gain increases. Typically, as the transmitter and receiver get moved farther apart the voltage at the receiver will drop. However, according to embodiments of this disclosure, as the resonant frequencies converge the voltage gain is improved, which can counteract the voltage drop caused by increased distance. The effect achieved by designing the resonant system to have this characteristic results in a TET system in which an automatic control system is not needed. The circuit is essentially self-tuning.

There are several possible configurations possible for the impedance matching network. These are all can be tuned to provide similar performance. The preferred circuit topology will be dictated by other concerns, such as practical aspects of winding coupled coils, and construction of inductors.

The resonant systems described herein can have several resonant frequencies. In one embodiment, an eighth order system is considered. The system can have four resonant frequencies, or eight complex eigen values. The eigen values of the system can be dependent on all the parameters of the system such as the inductor and capacitor values as well as the coupling coefficient between the coils. As any of these parameters change, the resonant frequencies will change. The circuit can be configured such that two of the resonant frequencies will move closer to the operating frequency as the coupling coefficient gets smaller. This behavior can be designed into a circuit that is fourth order or greater; an eighth order circuit is considered here because it is convenient for the design of the impedance matching networks. This behavior is determined by the component values used in the circuit. Finding the component values that result in this behavior is very difficult to do analytically. For the circuit examples described here the component values were found using iterative numerical analysis techniques.

Figure 6:
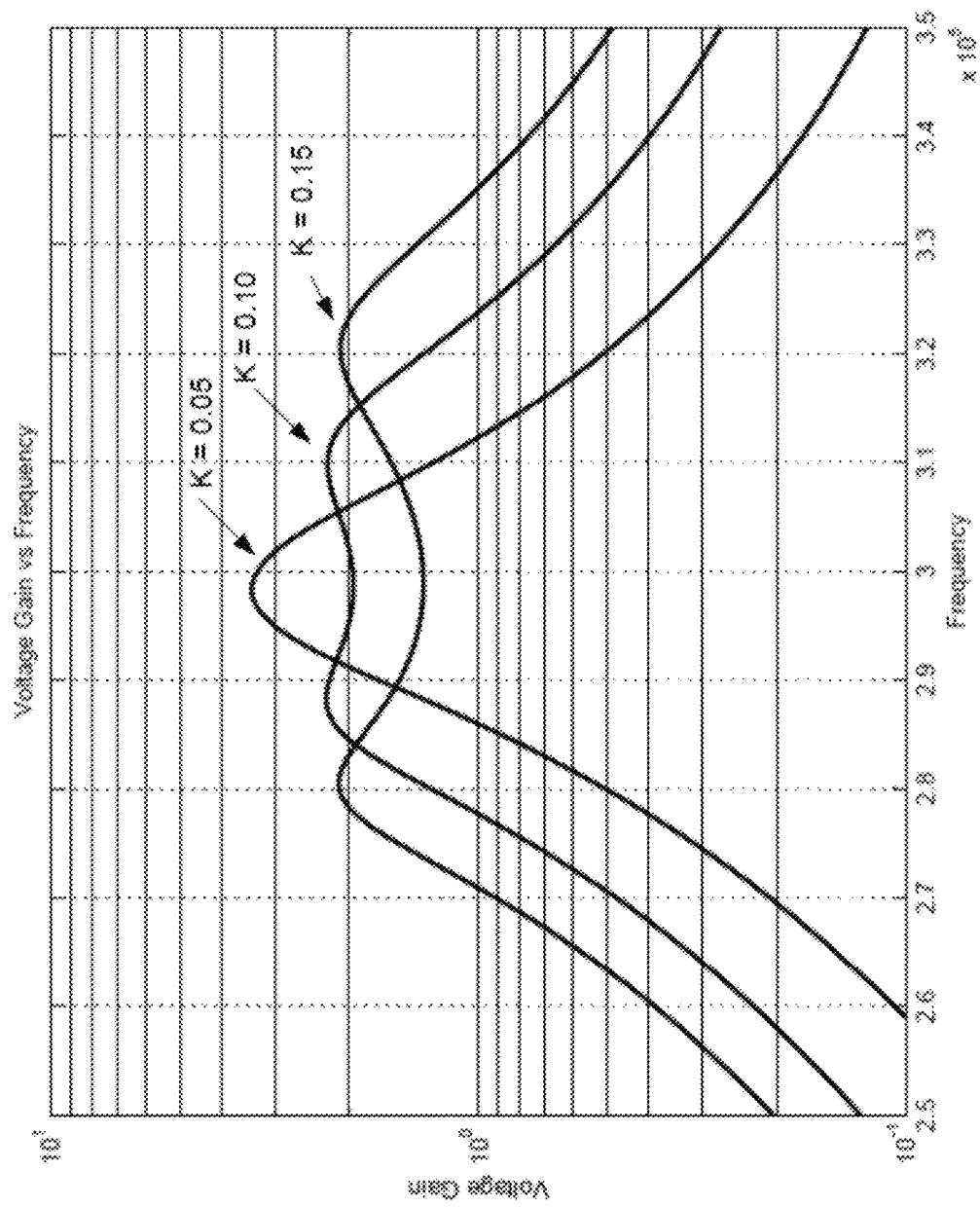
FIG. 6 illustrates a voltage gain vs. frequency plot showing the effect of coupling coefficient.

The separation of the resonant frequencies is shown in FIG. 6, showing the effect of a changing k on voltage gain vs. frequency. The peaks of the voltage gain move farther apart as k gets larger. For example, a resonant system with a k of 0.15 in FIG. 6 shows two peaks of voltage gain at a frequency of approximately 2.8 and $3.2 \times 10^5$ Hz. A smaller k value of 0.10 shows two peaks of voltage gain closer together (at 2.9 and $3.1 \times 10^5$ Hz), but with a larger voltage gain than with the k value of 0.15. Similarly, a k value of 0.05 shows a single, larger peak of voltage gain at the operating frequency of $3 \times 10^5$ Hz.

The resonators tuning can also be optimized to keep other parameters within a given range. Possible other parameters in addition to voltage gain include efficiency, and the power handling capability for a given source voltage. This system of this embodiment is self-tuning, therefore it does not require an external control system to operate. It can be designed to operate without a microcontroller continuously tuning the circuit. Prior implementations have required the circuit to be tuned on the fly, and require a sophisticated control system.

Figure 16:
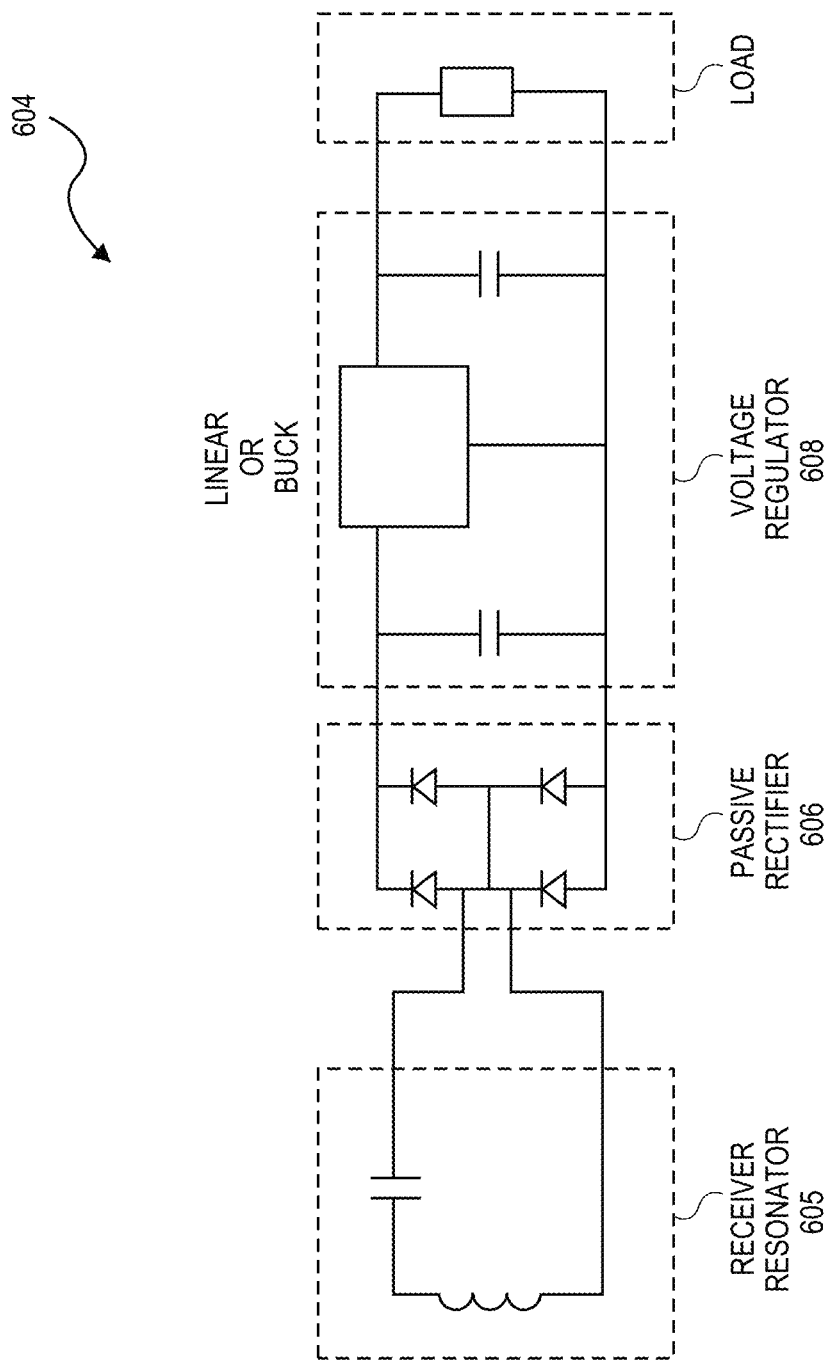
FIG. 16 shows one embodiment of a receiver with a passive rectifier circuit.

FIG. 16 illustrates one embodiment of a receiver 604 in a TET system. In this system, the receiver resonator 605 is coupled to a load via a passive (diode) rectifier 606 and a voltage regulator 608. The passive rectifier can convert alternating current in the receiver to direct current, which can then be delivered to the voltage regulator to maintain a constant voltage level on the load.

Figure 17:
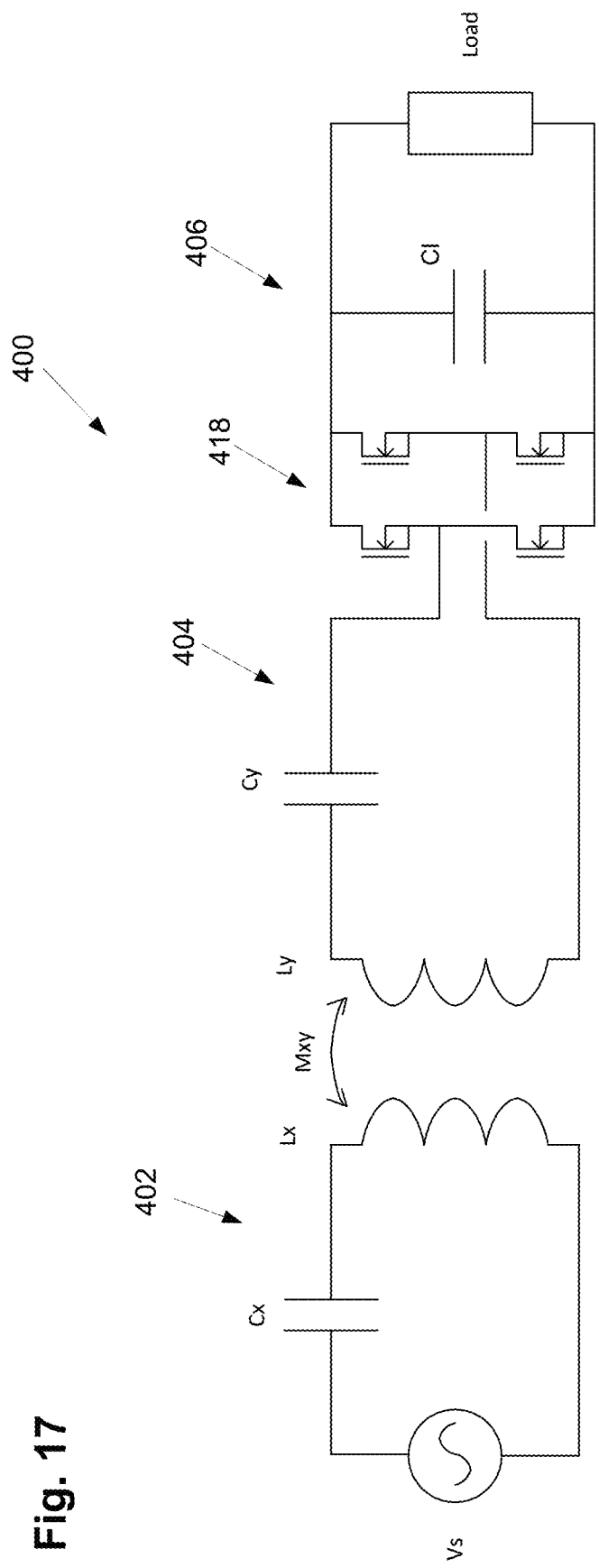
FIG. 17 illustrates one embodiment a TET system designed so the output voltages from the resonators remain relatively steady with variations in coupling and load.

FIG. 17 illustrates one embodiment of an exemplary TET system 400 including transmitter 402 and receiver 404, the system being designed so the output voltages from the resonators remain relatively steady with variations in coupling and load. Transmitter 402 can comprise a voltage source and a resonant circuit, such as an inductor Lx and a capacitor Cx. Receiver 404 also includes an inductor Ly and a capacitor Cy, and further comprises a rectifier circuit 406 coupling the receiver to the load. In the embodiment shown in FIG. 17, the rectifier circuit 406 at the receiver can be made up of FETs 418 which can be controlled to form a circuit functioning as a synchronous rectifier, in contrast to the passive diode rectifier circuits commonly used and shown in FIG. 16. This synchronous rectifier of FIG. 17 can be configured to minimize the voltage drop across the rectifier and improve the efficiency of the circuit.

In FIG. 17, setting up the rectifier circuit 406 as a full bridge models the receiver as a controlled voltage source. The voltage source is capable of either sinking or sourcing power. As a receiver, it will normally be sinking power. If the phase of the voltage source is controlled, it can make the load on the system appear reactive. The reactance of the load can be used to help tune resonant frequencies in the power transfer resonators. Essentially, it can act as a variable capacitor.

Thus, power through the system 400 can be controlled by varying the magnitude and phase of either or both of the two voltage sources, either Vs of the transmitter or the rectifier circuit of the receiver. Additionally, power transmission in the system can be controlled entirely by the receiver, by controlling the rectifier circuit 406 to change the apparent phase/output of the load. If transmitter voltage is fixed, then receiver can control power flow by varying voltage and phase of the rectifier circuit.

Additionally, if the duty cycle of the FET bridge rectifier circuit 418 is controlled, the bridge can work as a boost converter in one stage, as opposed to the two-stage process shown in FIG. 16 (diode bridge followed by a voltage regulator). This eliminates the need for a second stage that does the voltage regulation. The boost converter uses the impedance of the resonator as the inductor of a switching regulator, so the need for an additional inductor is eliminated.

If the FETs in the rectifier are controlled, the phase of the load does not necessarily have to line up with the phase of the current. Operation of the FETs can change the power factor of the load and can make the load look more inductive or capacitive. Operation of the FETs can be used to change the tuning of the resonance and to control how much power is being delivered.

By setting up the FETs in the load rectifier as a full bridge, the rectifier circuit essentially acts as a controlled voltage source. This make the system look like a voltage source at the transmitter, and a voltage source at the receiver, connected by an impedance made up of the resonant system. The power flow through the system can be controlled by varying the magnitude and phase of the two voltage sources relative to each other. If the transmitter voltage source is fixed, then the receiver can control the power flow by varying the voltage and phase of its voltage source, the active rectifier.

In one embodiment, the FETs can be controlled using receiver phase control. If the rectifier circuit 406 of receiver 404 is set up to do active rectification, it will need to be operating synchronously to the transmitter. The switching of the MOSFETs controls the receiver voltage, which will need to be phase locked with the current.

There are at least a couple ways to control the switching. A first method drives each side of the bridge with a square wave, the relative phase of the two side determines the effective voltage. The receiver will need to be able to sense the AC current, and run a phase locked loop to synchronize the MOSFET switching. A second method is to control drive each side of the bridge with a center aligned, pulse width modulated signal. The two sides can be 180 degrees out of phase. The duty cycle determines the effective voltage at the bridge. These techniques can be implemented in software running a microcontroller, or in analog hardware.

Since the system is typically running at a couple hundred kHz, the PWM peripheral of the processor will have limited resolution, both for controlling the output period and controlling the output duty cycle. This will result in significant jitter due to quantization. This can be smoothed out using sigma-delta modulation techniques.

The power can be controlled to the point where it is even possible for the load power to be negative, so the receiver is transmitting power. This circuit is similar to using the impedance of the resonator to be the inductor in a switching regulator.

Figure 7:
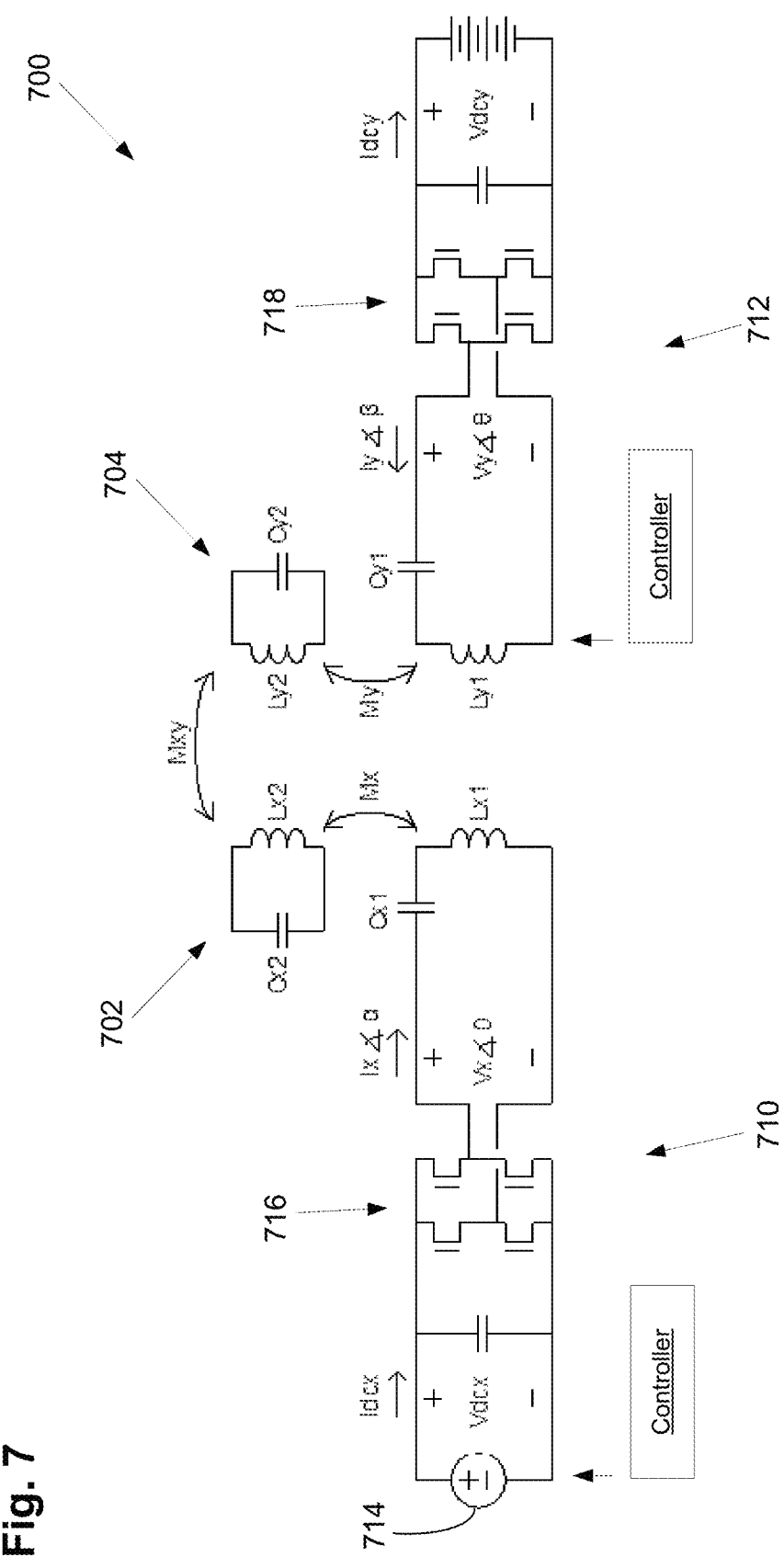
FIG. 7 illustrates one embodiment of a resonant system with magnetic impedance matching networks.

In another embodiment, a TET system can include magnetically coupled resonant L-C circuits configured to pass energy from a transmitter to a receiver. The magnetically coupled systems described herein can be implemented in a way so as to maximize system efficiency under a broad range of operating conditions. FIG. 7 illustrates one embodiment of a TET system 700 having a magnetically coupled impedance matching network. System 700 can include a transmitter resonator 702 and a receiver resonator 704. These two circuits can be excited by magnetic impedance matching circuits 710 and 712, respectively, which can connect the transmitter resonator 702 to the power source and the receiver resonator 704 to the load. A controller or microcontroller can be coupled to the transmitter and/or receiver, as shown.

In FIG. 7, the DC voltage source 714 and MOSFET bridge 716 can be modeled as a controlled AC voltage source. The magnitude of the voltage source can be controlled by controlling the duty cycle of the MOSFET switching. This magnitude is a phasor voltage Vx. For this analysis the angle of this voltage source is used as the reference for all the phasor angles in the system.

The resonant system illustrated in FIG. 7 is an 8$^{th}$ order L-C circuit. The system should include enough damping to dampen out the natural response quickly relative to the sample rate of the discrete time control system. This way only the forced response of the system needs to be considered. In some embodiments, the circuit can be operated at 250 kHz, and the control loop can run at approximately 1 kHz. One will appreciate from the description herein that these principles can be applied to a broad range of operating frequencies. For example, the system can be designed to run at frequencies between about 100 kHz and about 20 MHz.

The resonant system of FIG. 7 can be represented by a black box two port network. If "A" parameters are used, this is described as:

$$\begin{bmatrix} Vx \\ Ix \end{bmatrix} = \begin{bmatrix} A & B \\ C & D \end{bmatrix} \cdot \begin{bmatrix} Vy \\ -Iy \end{bmatrix}$$

All the terms in the two port network are phasors. In one embodiment, the operating frequency can be 250 kHz. The parameters of the two port system are functions of the coupling coefficient between the coils in the transmitter and receiver resonators. As the coils are physically moved with respect to each other, the coupling coefficient will change, causing the parameters of the two port network to change. In some embodiments, the capacitors in the system (such as the capacitors in resonators 702 and 704 of FIG. 7) can be variable. This offers another degree of freedom for tuning the circuit, however for purposes of discussion the capacitors in this particular system are assumed to be fixed values.

Referring still to FIG. 7, the MOSFET bridge 718 on the receiver is modeled as an AC voltage source. In normal operation this voltage source will be sinking power. The power can be converted to a DC voltage. For this analysis the bridge is assumed to be 100% efficient, so given conservation of power, the AC power absorbed by the AC voltage source is converted into the DC power produced by the DC voltage source.

Figure 8:
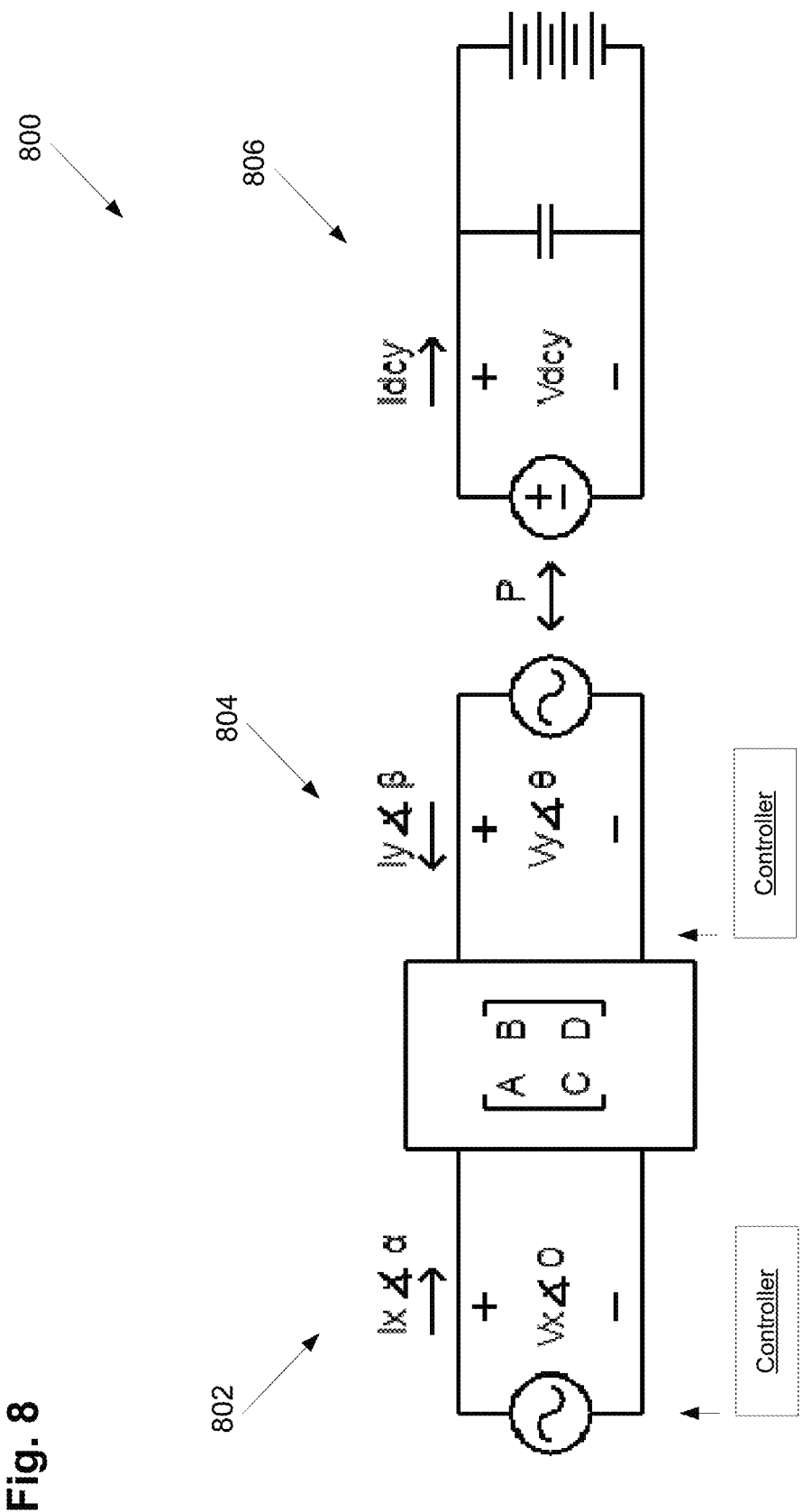
FIG. 8 is a simplified diagram of FIG. 7.

Given these simplifications the system can be modeled as shown in FIG. 8. The system 800 of FIG. 8 is divided into two halves, the transmitter 802 and receiver 804. The receiver can be connected to a load 806. The information that can be communicated between the transmitter and receiver is very limited. For simplification it is assumed there is no communication between the transmitter and receiver. This means there can be a control system or controller on the transmitter side and a separate control system or controller on the receiver side that are working independently and are only coupled through interactions with the plant: the resonant system.

On the transmitter 802 side the magnitude of the voltage Vx can be controlled with a controller in the transmitter to get a desired Ix. Since the angle of the voltage Vx is used as the angle reference for the system, the magnitude of the voltage is the only value that can be manipulated. The goal is to get a large Ix resulting in a large magnetic field in the resonant system so the range of the system is as large as possible.

On the receiver 804 side the AC voltage source Vy can be varied with a controller in the receiver. Both the magnitude and phase angle can be manipulated. The goal of controlling this is to control either Vdcy or Idcy depending on how the load 806 is configured. If the resonators are coupled to an implanted medical device, such as an LVAD, the load can be a battery and a pump. In this example, the DC voltage is the battery voltage, and Idcy is controlled to charge the battery. The value of Idcy can be controlled according to a battery charge algorithm executed by the controller on the receiver. On very rare occasions a battery fault can result in the battery being disconnected from the DC bus. Under these conditions the DC bus voltage needs to be controlled.

Figure 9:
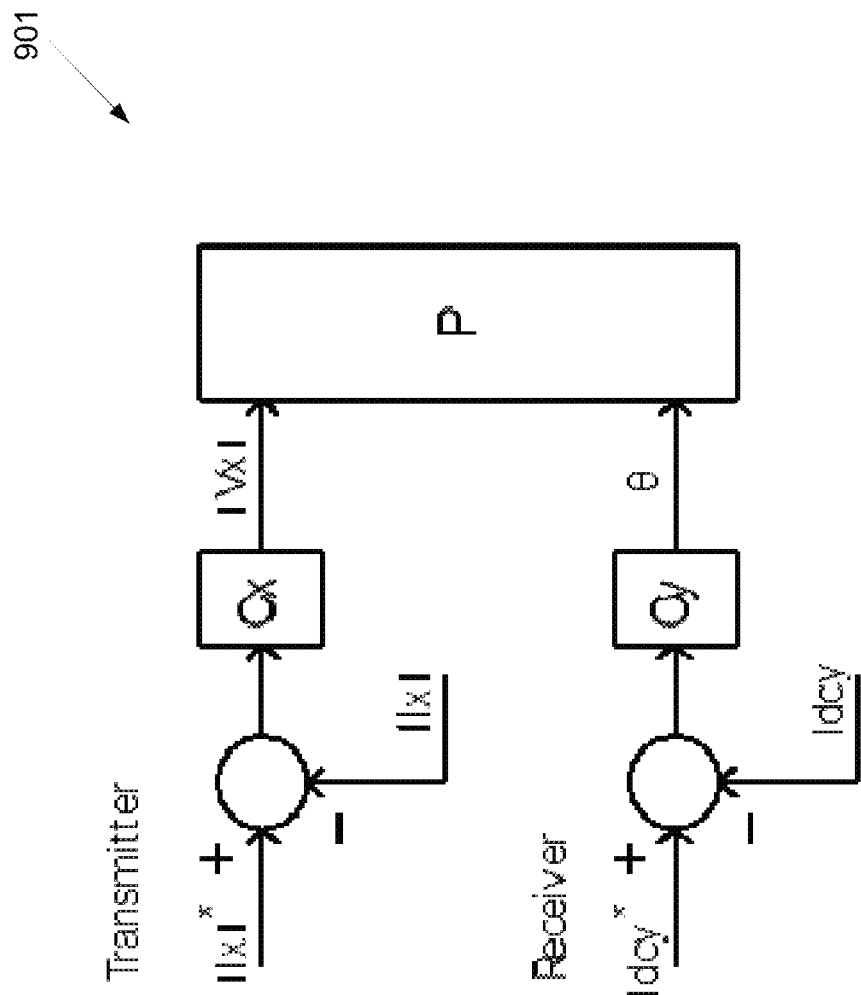
FIG. 9 illustrates one embodiment of a simplified control system.

A generalized control system 901 can be represented as shown in FIG. 9. Cx is a generic control law that adjusts the transmitter voltage Vx to achieve a desired transmitter current, Ix. Cy is a generic control law that adjust the phase angle θ of the receiver voltage to achieve a desired DC bus current, Idcy. P represents the plant, this is the system shown in FIG. 8. There are many possible control schemes that can be used for Cx and Cy. A common implementation would use a PID controller. The control system can be implemented in firmware running on two controllers or microcontrollers, one in the transmitter and one in the receiver. Thus, in some embodiments there are two control systems, one in the transmitter and one in the receiver, both acting on the same resonant system. The electronic hardware in the system can have outputs that can control the switching of the MOSFET bridges in both the transmitter and receiver. The switching can control the voltage magnitude, frequency or phase of the voltage on the AC side of the bridges, $V_x \angle 0$ and $V_y \angle \theta$ as shown in FIGS. 7 and 8. The hardware can also have sensors to measure the currents in system, $I_x \angle \alpha$ and $I_y \angle \beta$. The part of the control system implemented in the transmitter (e.g., the transmitter of FIGS. 7-8) is configured to adjust the magnitude of Vx to drive Ix to a specific value. The part of the control system implemented in the receiver (e.g., the receiver of FIGS. 7-8) is configured to adjust the phase angle of the rectifier voltage to drive Idcy to a specified value. The details of the actual control systems are more complicated.

The goal of the transmitter controller is to run a large current in the transmitter resonator in order to get a large magnetic field. Increasing the size of the magnetic field maximizes the range of the resonator system. The controller for the transmitter can be a relatively simple PI controller shown in FIG. 10. In one embodiment, the controller observes the magnitude of the current in the transmitter exciter winding, Ix, compares it to a desired reference point, Ix*. The error between the desired current and the actual observed current is used to turn the output voltage Vx up or down until the actual current matches the desired current. The output voltage command, Vx corresponds to the duty cycle of the MOSFET bridge 716 from FIG. 7.

Figure 10:
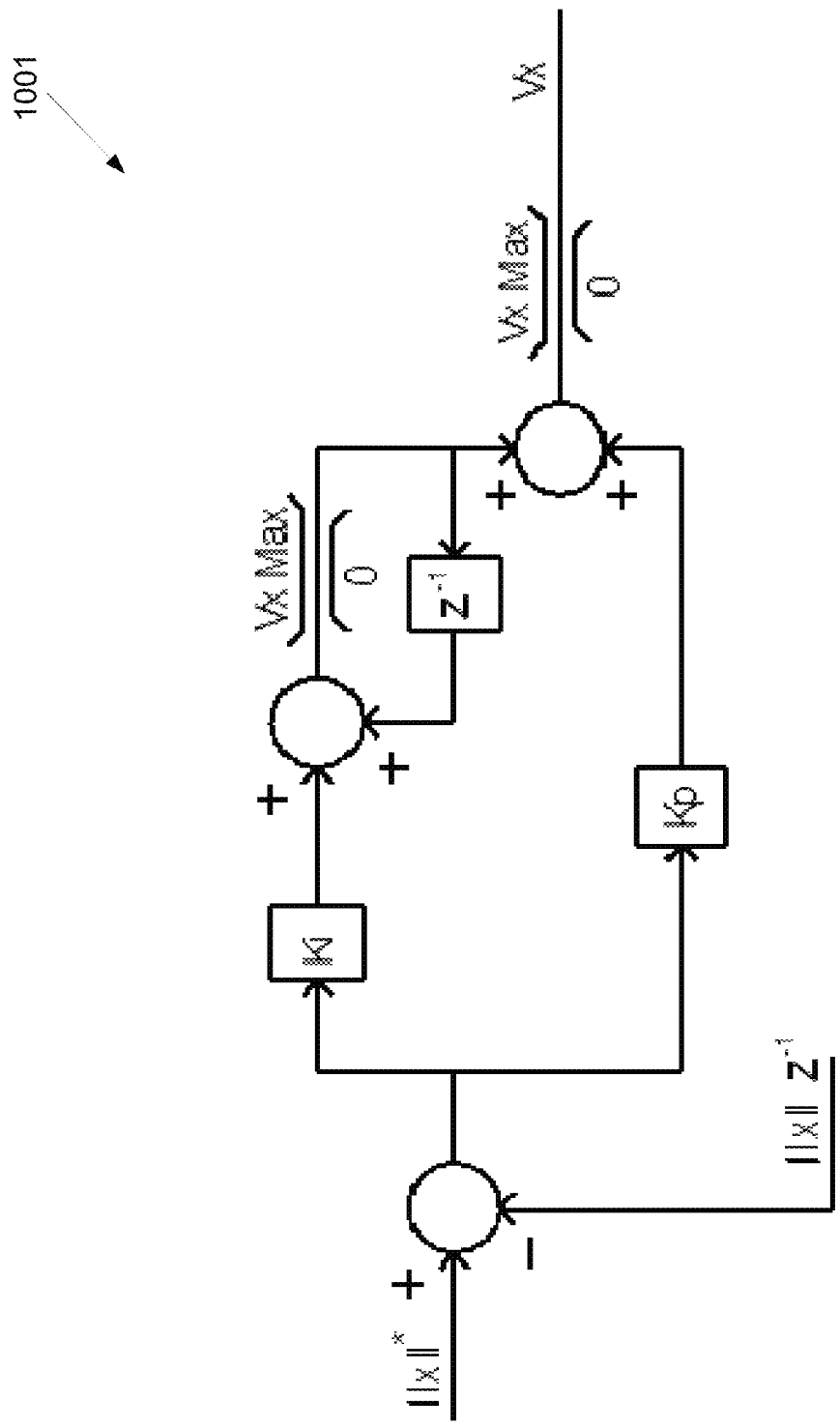
FIG. 10 illustrates a PI controller for a transmit resonator.

In practice, the input impedance of the resonant system is frequently high enough that the transmitter is running at its maximum output voltage. The integrator in the transmitter control loop needs a clamp to prevent windup. The control system 1001 in FIG. 10 is configured to prevent windup of the system at high or maximum output voltages.

The MOSFET bridge (716 from FIG. 7) controlling the AC voltage source Vx is limited by the source DC bus voltage. The duty cycle can only go up to 100%. For some resonant systems this may be limited to a ⅔ duty cycle. The actual output of the MOSFET bridge is a square wave which will have higher order odd harmonics. A ⅔ duty cycle will result in a voltage wave form with no $3^{rd}$ harmonic or multiples of the $3^{rd}$ harmonic. This is useful to avoid distortion of the waveform if the resonant system has eigen values that fall close to the $3^{rd}$ harmonic, 750 kHz.

Figure 11:
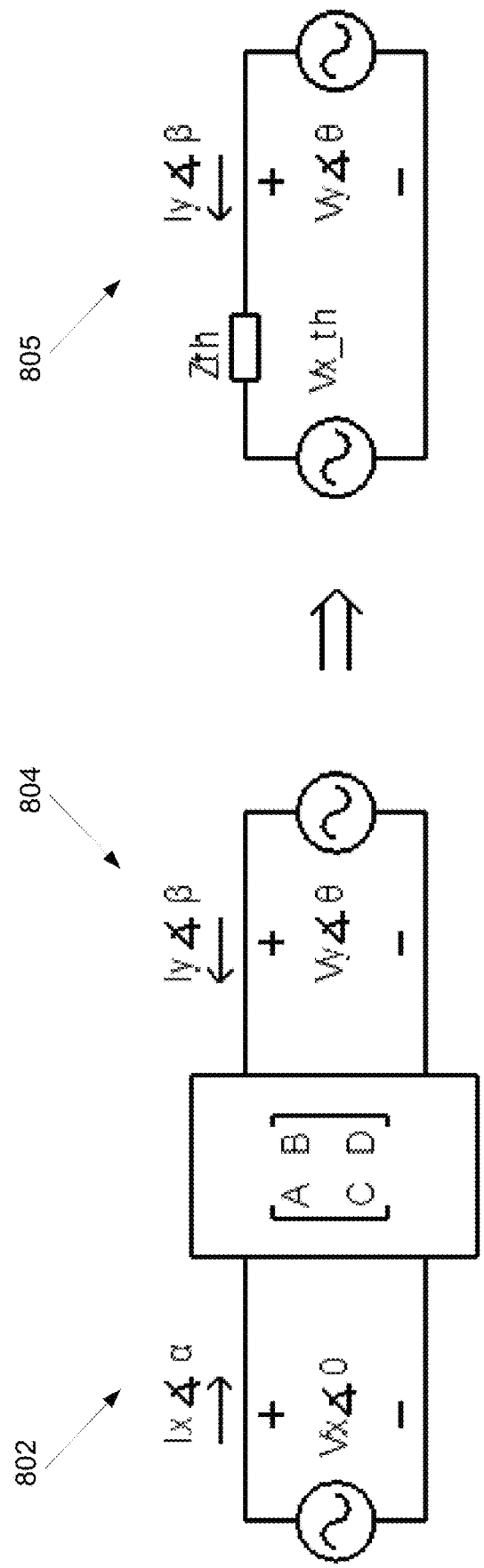
FIG. 11 shows a Thevenin equivalent of the resonators of FIG. 8.
Figure 12:
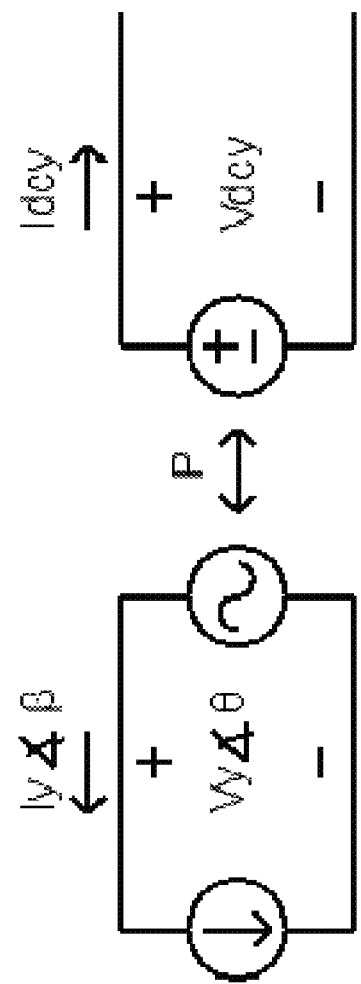
FIG. 12 illustrates a simplified schematic of one portion of a circuit according to the invention.

The receiver control is more complicated. To start with, a slightly better model of the plant needs to be developed. The resonant system is modeled looking at the receiver side only. A Thevenin equivalent 805 of resonators 802 and 804 of FIG. 8 is shown in FIG. 11. The Thevenin equivalent voltage is usually much larger than Vy, and the equivalent impedance is relatively large. As a result this can be approximated as a current source driving Iy as shown in FIG. 12.

The MOSFET bridge of the receiver, item 718 from FIG. 7, can be modeled as an AC voltage source coupled to a DC voltage source. In this model the two voltage sources represent the MOSFET bridge as seen from the DC side and from the AC side. The two sides are linked so that the power flowing into one side equals the power flowing out of the other side. More specifically, the voltage sources of the transmitter and receiver are coupled such that the real power flowing into one is the same as the real power flowing out of the other. This assumes 100% efficiency, which for these purposes is a reasonable approximation.

The power relationship can be expressed as:

$$\text{Re}\{-Iy^* \cdot Vy\} = Idc \cdot Vdc$$
$$\text{Re}\{Iy \cdot (Vy \cdot \cos(\theta - \beta + \pi) + j \cdot \sin(\beta - \theta))\} = Idc \cdot Vdc$$
$$Iy \cdot Vy \cdot \cos(\theta - \beta + \pi) = Idc \cdot Vdc$$
$$Idc = Iy \frac{Vy}{Vdc} \cos(\theta - \beta + \pi)$$

Referring back to FIG. 8, the angle of the transmitter voltage can be arbitrarily picked as the reference, so θ can be the angle of the receiver voltage relative to the transmitter voltage, and β can be the angle of the receiver current relative to the transmitter voltage. To control the receiver, the difference between θ and β is important. In the last expression, Iy is an input to the system that is a function of the operating condition of the resonators and the transmitter current. The term $$\frac{Vy}{Vdc}$$

is proportional to the duty cycle of the MOSFET bridge of the receiver, this is expressed as Kd. The angle (θ−β) is the difference in the angle of the current and the voltage. The π occurs in the cos in order to make the magnitude of the equation positive. In order to control the DC current the receiver can control either θ or the duty cycle. In this design, the duty cycle is fixed and the phase angle is the controller output of the voltage, θ.

Figure 13:
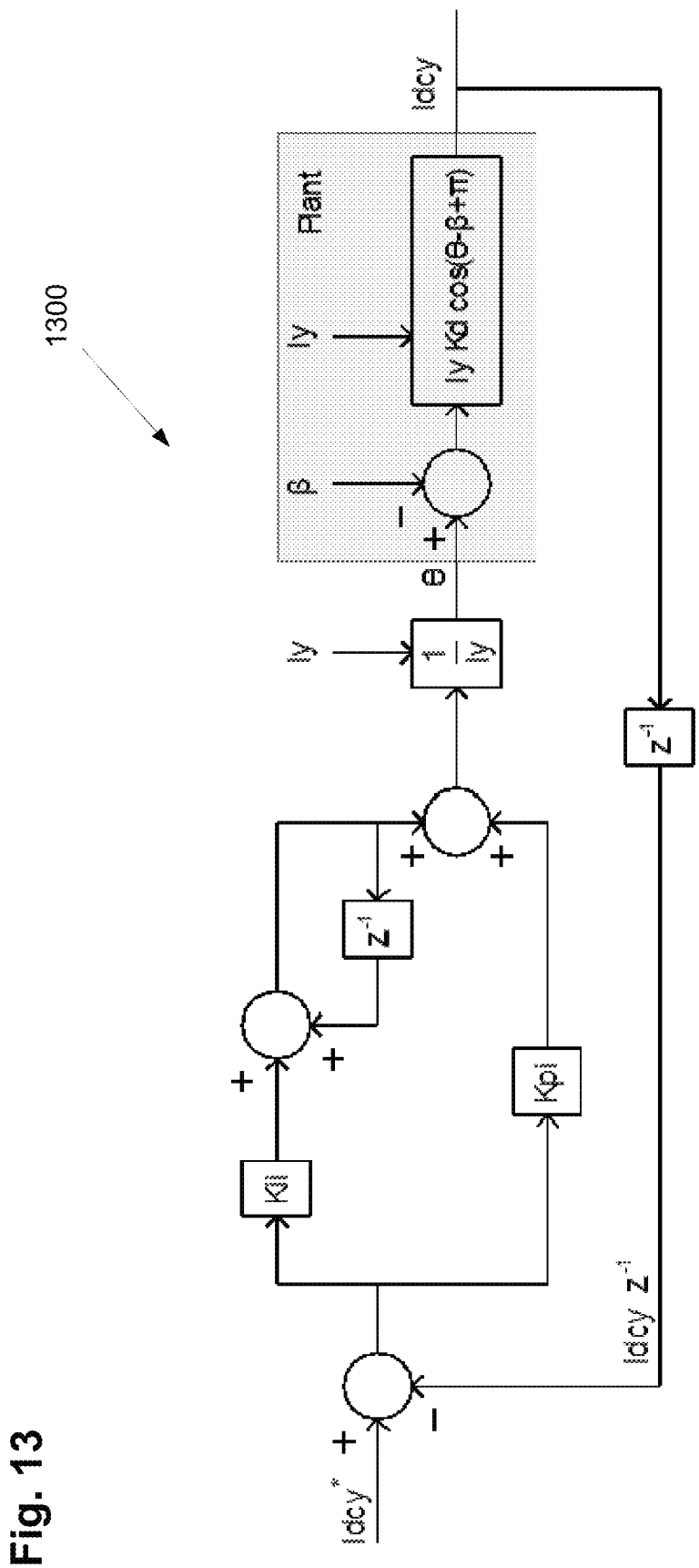
FIG. 13 illustrates a PI controller on the receiver configured to control the DC current.

To control the DC current, a PI controller can be used, as shown in FIG. 13. The PI controller 1300 observes the difference between the requested current and the actual current and adjusts θ, the angle of the voltage, in order to drive Idcy to match the requested value. In FIG. 13 the gain block Kii and Kpi are the proportional and integral gains, the extra 'i' in the subscript is notation to indicate these are gains for controlling the current. The greyed out section of FIG. 13 represents the plant using the approximate model derived above.

A minor refinement to the basic PI controller is to add a factor of $$\frac{1}{Iy}$$

to the forward path. Iy is measured by the controller, and adding this term keeps the loop gain constant as Iy changes due to conditions in the resonator. The stability of the control loop is a function of all the gains in the loop. Iy shows up as a gain in this loop, so stability over a broad range of conditions can be improved by correcting for Iy.

It should be noted that the integrator in FIG. 13 does not have a clamp since its output is an angle, so rather than saturating, the output angle wraps around in a circle. The angle of the current β is ultimately driven by the transmitter. Since the clocks of the transmitter controller and the receiver controller are not synchronous, β will be slowly drifting around with respect to the reference in the receiver due to the difference between the clock on the transmitter and the clock on the receiver. Letting the integrator wrap around allows the receiver to track this drift.

Figure 14:
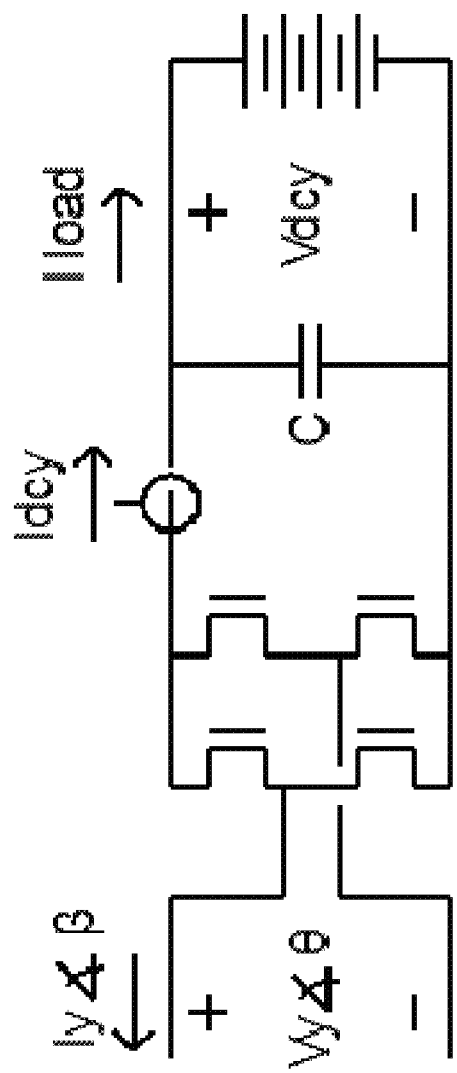
FIG. 14 shows the Idc current sensor between the output of the MOSFET bridge and the capacitor.

In the rare case where the battery is not connected, the TETS system needs to be able to control the DC bus voltage. To accomplish this, a voltage control loop is wrapped around the current controller. To help with the stability of the controller a capacitor can be used on the DC bus. The Idc current sensor is between the output of the MOSFET bridge and the capacitor. This is shown in FIG. 14.

The voltage on the bus is a function of the capacitor current (Idcy−Iload). For a given sample period, Ts, the bus voltage is:

$$Vdcy(t) = \int \frac{(Idcy - Iload)}{C} dt$$

$$Vdcy(z) = \frac{(Idcy - Iload) \cdot Ts}{(1 - z^{-1}) \cdot C}$$

Figure 15:
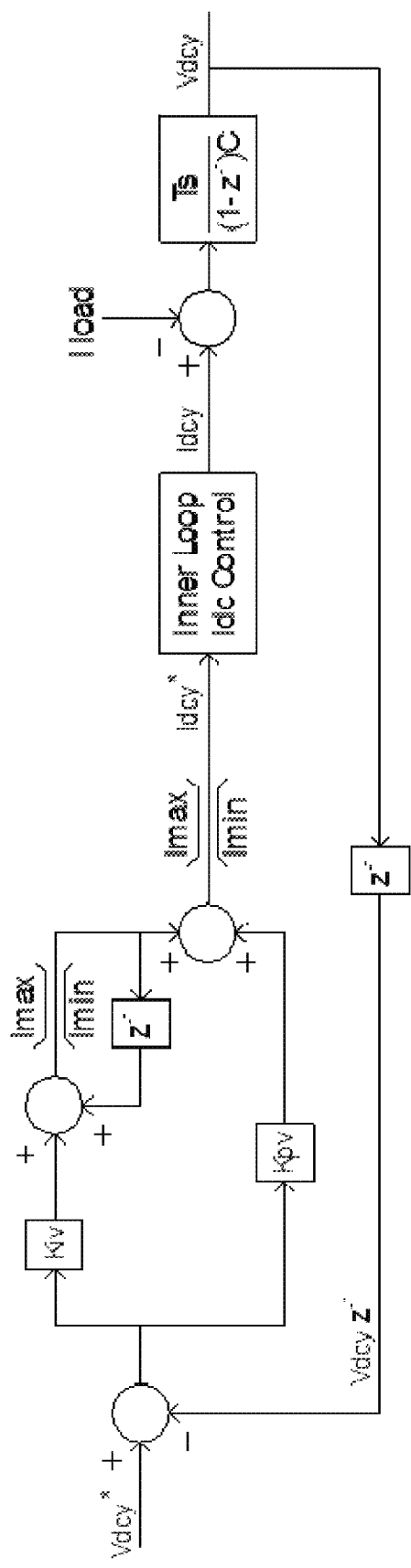
FIG. 15 illustrates a PI controller that can be used to control the voltage, with the Idcy current controller embedded in the control loop.

In FIG. 15, a simple PI controller can be used to control the voltage, with the Idcy current controller, from FIG. 13, embedded in the control loop. This wraps a voltage control loop around the current control loop to regulate the DC bus voltage. The load current is modeled as a disturbance that the control loop act to reject to keep the DC bus voltage constant. The capacitor on the bus is required in order to keep the control loop stable. The larger the capacitance the easier it is to keep the loop stable.

As for additional details pertinent to the present invention, materials and manufacturing techniques may be employed as within the level of those with skill in the relevant art. The same may hold true with respect to method-based aspects of the invention in terms of additional acts commonly or logically employed. Also, it is contemplated that any optional feature of the inventive variations described may be set forth and claimed independently, or in combination with any one or more of the features described herein. Likewise, reference to a singular item, includes the possibility that there are plural of the same items present. More specifically, as used herein and in the appended claims, the singular forms "a," "and," "said," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs. The breadth of the present invention is not to be limited by the subject specification, but rather only by the plain meaning of the claim terms employed.

What is claimed is:

1. A wireless power transfer system comprising:
a transmitter comprising a transmit resonator coupled to a voltage source; and
a receiver comprising a receive resonator, a load, a rectifier coupled between the receive resonator and the load and comprising a plurality of field effect transistors (FETs), and a receiver controller configured to control the plurality of FETs to tune a resonance of the wireless power transfer system.

2. The wireless power transfer system of claim 1, wherein the receiver controller is configured to control a duty cycle of the plurality of FETs to cause the rectifier circuit to operate as a single stage boost converter.

3. The wireless power transfer system of claim 1, wherein the receiver controller is configured to control the plurality of FETs by driving each side of the rectifier circuit with a square wave.

4. The wireless power transfer system of claim 1, wherein the receiver controller is configured to control the plurality of FETs by driving each side of the rectifier circuit with a center aligned, pulse width modulated signal.

5. The wireless power transfer system of claim 4, wherein the pulse width modulated signal on a first side of the rectifier circuit is 180 degrees out of phase with the pulse with modulated signal on a second side of the rectifier circuit.

6. The wireless power transfer system of claim 1, wherein the receiver controller is configured to:
detect an alternating current through the receive resonator; and
run a phase locked loop to synchronize switching of the plurality of FETs.

7. The wireless power transfer system of claim 1, wherein the transmitter further comprises a metal-oxide-semiconductor field-effect transistor (MOSFET) bridge coupled between the transmit resonator and the voltage source, wherein the voltage source and the MOSFET bridge form a controlled AC voltage source, and wherein a voltage of the controlled AC voltage source is controllable by modifying a switching duty cycle for the MOSFET bridge.

8. The wireless power transfer system of claim 1, wherein the receiver further comprises a current sensor coupled to an output of the rectifier circuit.

9. The wireless power transfer system of claim 1, wherein the receiver controller comprises a current sensor configured to measure an AC current through the receive resonator.

10. The wireless power transfer system of claim 1, wherein the load is a battery, wherein the rectifier circuit is configured to output a DC current, and wherein the receiver controller is configured to control the DC current according to a battery charge algorithm.

11. The wireless power transfer system of claim 1, wherein the receiver controller is configured to control the plurality of FETs based on a difference between an angle of a receiver voltage and an angle of a receiver current.

12. The wireless power transfer system of claim 1, wherein the receiver controller is a proportional-integral controller.

13. The wireless power transfer system of claim 12, wherein the proportional-integral controller incorporates a factor of an inverse of a current through the receive resonator to keep a loop gain constant as the current through the receive resonator changes.

14. A wireless power transfer system comprising:
a transmitter comprising a transmit resonator, a voltage source, a metal-oxide-semiconductor field-effect transistor (MOSFET) bridge coupled between the transmit resonator and the voltage source, and a transmitter controller configured to control switching of the MOSFET bridge; and
a receiver comprising a receive resonator coupled to a load.

15. The wireless power transfer system of claim 14, wherein the transmitter controller is a proportional-integral controller comprising an integrator.

16. The wireless power transfer system of claim 15, wherein the integrator is clamped to prevent windup at high output voltages.

17. The wireless power transfer system of claim 14, wherein the transmitter further comprises a transmitter exciter winding, and wherein the transmitter controller is further configured to:
- measure a current through a transmitter exciter winding;
- compare the measured current to a desired reference current; and
- adjust an output voltage of the transmitter until the measured current matches the desired reference current.

18. A method of operating a wireless power transfer system, the method comprising:
- inductively coupling a transmitter to a receiver, the transmitter including a transmit resonator coupled to a voltage source, and the receiver including a receive resonator, a load, a rectifier coupled between the receive resonator and the load and including a plurality of field effect transistors (FETs), and a receiver controller; and
- controlling, using the receiver controller, the plurality of FETs to tune a resonance of the wireless power transfer system.

19. The method of claim 18, wherein controlling the plurality of FETs comprises controlling a duty cycle of the plurality of FETs to cause the rectifier circuit to operate as a single stage boost converter.

20. The method of claim 18, wherein controlling the plurality of FETs comprises controlling the plurality of FETs by driving each side of the rectifier circuit with a square wave.

* * * * *